US007860383B2

(12) United States Patent
Nomura et al.

(10) Patent No.: US 7,860,383 B2
(45) Date of Patent: Dec. 28, 2010

(54) IMAGING DEVICE

(75) Inventors: Hiroshi Nomura, Saitama (JP); Shinya Suzuka, Saitama (JP); Takamitsu Sasaki, Saitama (JP); Ken Endo, Saitama (JP); Toshiharu Suzuki, Saitama (JP); Kazunori Ishizuka, Kanagawa (JP)

(73) Assignee: Hoya Corporation, Tokyo (JP)

( * ) Notice: Subject to any disclaimer, the term of this patent is extended or adjusted under 35 U.S.C. 154(b) by 132 days.

(21) Appl. No.: 12/401,725

(22) Filed: Mar. 11, 2009

(65) Prior Publication Data
US 2009/0231709 A1 Sep. 17, 2009

(30) Foreign Application Priority Data

Mar. 13, 2008 (JP) ............................. 2008-064457

(51) Int. Cl.
*G03B 17/00* (2006.01)
(52) U.S. Cl. ................. 396/55; 348/208.11; 359/823; 396/349
(58) Field of Classification Search .................. 396/55, 396/133, 144, 349; 359/822–824; 348/208.4, 348/208.7, 208.11, 208.12
See application file for complete search history.

(56) References Cited

U.S. PATENT DOCUMENTS

| 5,166,716 | A * | 11/1992 | Kawano ..................... 396/75 |
| 5,398,132 | A | 3/1995 | Otani |
| 6,295,412 | B1 | 9/2001 | Katano et al. |
| 7,097,367 | B2 | 8/2006 | Nomura |
| 7,435,016 | B2 | 10/2008 | Nomura |
| 7,536,091 | B2 * | 5/2009 | Nomura et al. .............. 396/55 |
| 2004/0042775 | A1 | 3/2004 | Nomura |
| 2007/0077047 | A1 | 4/2007 | Nomura et al. |
| 2007/0081806 | A1 | 4/2007 | Nomura et al. |
| 2009/0257137 | A1 * | 10/2009 | Yamano ................... 359/817 |

FOREIGN PATENT DOCUMENTS

| GB | 2427930 | 1/2007 |
| GB | 2454342 | 5/2009 |
| JP | 2006-157833 A | 6/2006 |
| JP | 2007-128055 A | 5/2007 |

OTHER PUBLICATIONS

English language Abstract of JP 2006-157833 A (Jun. 15, 2006).
English language Abstract of JP 2007-128055 A (May 24, 2007).

* cited by examiner

*Primary Examiner*—W. B. Perkey
*Assistant Examiner*—Autumn Parker
(74) *Attorney, Agent, or Firm*—Greenblum & Bernstein P.L.C.

(57) ABSTRACT

An imaging device includes an axial-direction moving member which moves between an operating position and a retracted position in an optical axis direction, an in-plane moving optical element movable in a plane orthogonal to the optical axis, a controller which moves the in-plane moving optical element in the orthogonal plane to a reference position when the image device changes from the operating state to the retracted state, and a mechanical guide device, provided between the axial-direction moving member and the in-plane moving optical element. In a state where the in-plane moving optical element is deviated from the reference position, the mechanical guide device guides the in-plane moving optical element to the reference position by using a moving force of the axial-direction moving member when the axial-direction moving member moves from the operating position to the retracted position.

12 Claims, 30 Drawing Sheets

IMAGING DEVICE

BACKGROUND OF THE INVENTION

1. Field of the Invention

The present invention relates to an imaging device which includes an axial-direction moving member and an in-plane moving optical element. The axial-direction moving member moves along an optical axis, and the in-plane moving optical element moves in a plane orthogonal to the optical axis. The present invention relates particularly to a retracting structure of the imaging device.

2. Description of the Related Art

Retractable lenses (retractable lens barrels) are widely used in optical devices such as digital cameras. In addition, cameras with a shake reduction system (image stabilizer) which moves an image pickup device (image sensor) in a plane orthogonal to an optical axis of a lens system so as to reduce image shake are known in the art (e.g., Japanese Unexamined Patent Publication No. 2006-157833 and Japanese Unexamined Patent Publication 2007-128055).

Retractable lenses are provided with at least one axial-direction moving member which moves between an operating position (e.g., photographing position) and a retracted position (e.g., non-photographing position) behind the operating position in an optical axis direction.

On the other hand, in a camera equipped with the shake reduction system, an optical element (in-plane moving optical element) is held in a normal position (neutral position) during standby and driven in a plane orthogonal to an optical axis by an electromagnetic device at a time of exposure when the camera is in a shake reduction mode. If a retractable lens is combined with such a type of shake reduction system, so as to constitute a camera system, and miniaturization of this camera system is pursued, a problem of interference arises between the axial-direction moving member of the retractable lens and the in-plane moving optical element of the shake reduction system in a fully-retracted state of the lens barrel.

SUMMARY OF THE INVENTION

The present invention provides an imaging device which includes an axial-direction moving element and an in-plane moving optical element, wherein a balance between further miniaturization of the imaging device in the retracted state thereof and a reliable retracting operation of the imaging device is achieved in which the axial-direction moving element and the in-plane moving optical element do not interfere with each other.

According to an aspect of the present invention, an imaging device having an operating state and a retracted state is provided, including an axial-direction moving member which moves from a forward position to a rearward position in an optical axis direction when the imaging device changes from the operating state to retracted state; an in-plane moving optical element movable in a plane orthogonal to the optical axis; a controller which moves the in-plane moving optical element in the orthogonal plane to a reference position when the image device changes from the operating state to the retracted state; and a mechanical guide device, provided between the axial-direction moving member and the in-plane moving optical element, wherein, in a state where the in-plane moving optical element is deviated from the reference position, the mechanical guide device guides the in-plane moving optical element to the reference position by using a moving force of the axial-direction moving member when the axial-direction moving member moves from the forward position to the rearward position.

The controller can be a motor-powered controller which moves the in-plane moving optical element to the reference position when the image device changes from the operating state to the retracted state, wherein the motor-powered controller solely retains the in-plane moving optical element at the reference position even when a power of the motor-powered controller is turned OFF when the in-plane moving optical element has been moved to the reference position.

It is desirable for the motor-powered controller to include a guide mechanism to guide the in-plane moving optical element along the moving direction thereof, a stopper which determines a moving extremity of the in-plane optical element, a biasing member which biases the in-plane moving optical element toward the stopper so as to come into contact the stopper, and a motor which moves the stopper to move the in-plane moving optical element against the biasing force of the biasing member. In the case where the in-plane moving optical element is deviated from the reference position when the imaging device changes from the operating state to retracted state due to a mal-operation of the motor-powered controller, the mechanical guide device moves the in-plane moving optical element to the reference position against the biasing force of the biasing member so that the in-plane moving optical element and the stopper move away from each other.

The in-plane moving optical element is not limited to a specific optical element, for instance, the present invention can be applied to an imaging device in which the in-plane moving optical element is an image pickup device and in which the controller is of a type which, when said imaging device is in said operating state, operates to reduce image shake of an image formed on the image pickup device by moving the in-plane moving optical element in the orthogonal plane in a manner to counteract the image shake.

It is desirable for the imaging device to be provided with a first moving stage mounted on a stationary member to be movable linearly in a first direction in the orthogonal plane; and a second moving stage mounted on the first moving stage to be movable linearly in a second direction in the orthogonal plane, that is orthogonal to the first direction, the in-plane moving optical element being supported on the second moving stage. The reference position of the in-plane moving optical element is determined by positioning both the first moving stage and the second moving stage at stage reference positions thereof in the first direction and the second direction, respectively. The mechanical guide device includes a first moving guide surface which is formed on at least one of the first moving stage and the axial-direction moving member, wherein, in a state where the first moving stage is deviated from the stage reference position, the first moving guide surface engages with the other of the first moving stage and the axial-direction moving member to move the first moving stage to the stage reference position in the first direction; and a second moving guide surface which is formed on at least one of the second moving stage and the axial-direction moving member, wherein, in a state where the second moving stage is deviated from the stage reference position, the second moving guide surface engages with the other of the second moving stage and the axial-direction moving member to move the second moving stage to the stage reference position in the second direction.

It is desirable for the first moving guide surface is formed on an end of a projection, the projection projecting from the first moving stage in a direction parallel to the optical axis, and the second moving guide surface is formed on an end of a projection, the projection projecting from the second moving stage in a direction parallel to the optical axis.

Each of the first moving guide surface and the second moving guide surface includes a beveled surface which is inclined with respect to the optical axis direction.

In another embodiment of the mechanical guide device for the in-plane moving optical element, the following structure is possible. Namely, it is desirable for the imaging device to be provided, including a first moving stage mounted on a stationary member to be movable linearly in a first direction in the orthogonal plane; and a second moving stage mounted on the first moving stage, the second moving stage being supported by the first moving stage so as to be movable linearly in a second direction that is orthogonal to the first direction, the in-plane moving optical element being supported on the second moving stage. The reference position of the in-plane moving optical element is determined by positioning both the first moving stage and the second moving stage at stage reference positions in the first direction and the second direction, respectively. The mechanical guide device includes a projection which projects from the axial-direction moving member; and an omnidirectional guide hole which is formed on the second moving stage, wherein in a state where the first moving stage is deviated from the stage reference position, the omnidirectional guide hole engages with the projection to move the first moving stage integrally with the second moving stage to the stage reference position in the first direction, and in a state where the second moving stage is deviated from the stage reference position, the omnidirectional guide hole engages with the projection to move the second moving stage to the stage reference position in the second direction.

The omnidirectional guide hole has a shape capable of producing each of the following two component forces by a movement of the axial-direction moving member from the forward position to the rearward position: a component of force in a second direction which moves the second moving stage, and a component of force in a first direction which moves the first moving stage via the second moving stage, thereby making it possible to return the in-plane moving optical element to the reference position thereof.

It is desirable for the omnidirectional guide hole to be conical in shape with a central axis thereof extending substantially parallel to the optical axis.

It is desirable for the axial-direction moving member to support at least one lens group. It is desirable for this lens group that is supported by the axial-direction moving member to include a displaceable lens group movable between an on-axis position, in which the displaceable lens group is positioned on the optical axis, and an off-axis displaced position, in which the displaceable lens group is displaced from the optical axis. It is also desirable for the imaging device to include a displacing drive device which moves the displaceable lens group to the off-axis displaced position by using the moving force of the axial-direction moving member before the mechanical guide device starts guiding the in-plane moving optical element to the reference position.

In an embodiment, an imaging device is provided, equipped with an image stabilizer which moves an image sensor in a plane orthogonal to an optical axis to counteract image shake of an object image formed on the image sensor, the imaging device including an axial-direction moving member which moves between a forward position and a rearward position behind the forward position in an optical axis direction; a first moving stage mounted on a stationary member to be movable linearly in a first direction in the orthogonal plane; a second moving stage mounted on the first moving stage to be movable linearly in a second direction in the orthogonal plane, that is orthogonal to the first direction, the image sensor being supported on the second moving stage; a first moving guide surface which is formed on at least one of the first moving stage and the axial-direction moving member, wherein, in a state where the first moving stage is deviated from a reference position in the first direction, the first moving guide surface engages with the other of the first moving stage and the axial-direction moving member to move the first moving stage to the reference position in the first direction by using a moving force of the axial-direction moving member when the axial-direction moving member moves from the forward position to the rearward position; and a second moving guide surface which is formed on at least one of the second moving stage and the axial-direction moving member, wherein, in a state wherein the second moving stage is deviated from a reference position in the second direction, the second moving guide surface engages with the other of the second moving stage and the axial-direction moving member to move the second moving stage to the reference position in the second direction by using the moving force of the axial-direction moving member when the axial-direction moving member moves from the forward position to the rearward position.

According to the imaging device to which the present invention is applied, the retracting operation of the imaging device can be reliably completed with no interference between either of the in-plane moving optical element and the drive mechanisms therefor and other elements of the imaging device since the in-plane moving optical element is guided to the reference position thereof by the mechanical guide device if the in-plane moving optical element is not in the reference position (that can be preset, e.g., by the controller). Hence, such a highly efficient space utilization in the retracted state of the imaging device makes it possible to achieve further miniaturization of the imaging device, and ensures a reliable retracting operation of the imaging device.

The present disclosure relates to subject matter contained in Japanese Patent Application No. 2008-64457 (filed on Mar. 13, 2008) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
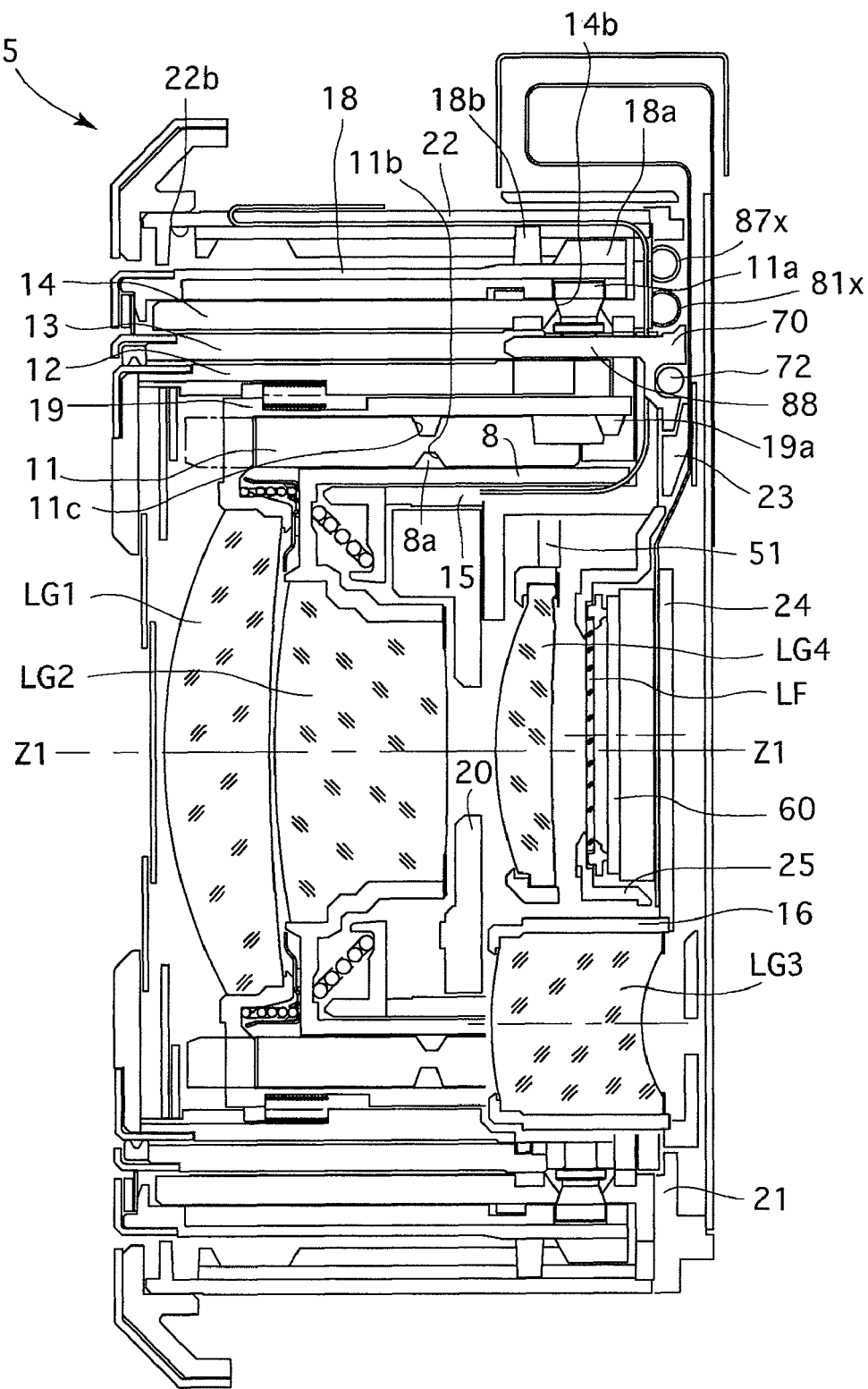
FIG. 1 is a cross sectional view of an embodiment of a zoom lens barrel in the fully-retracted state which is incorporated in a digital camera (imaging device) according to the present invention.
Figure 2:
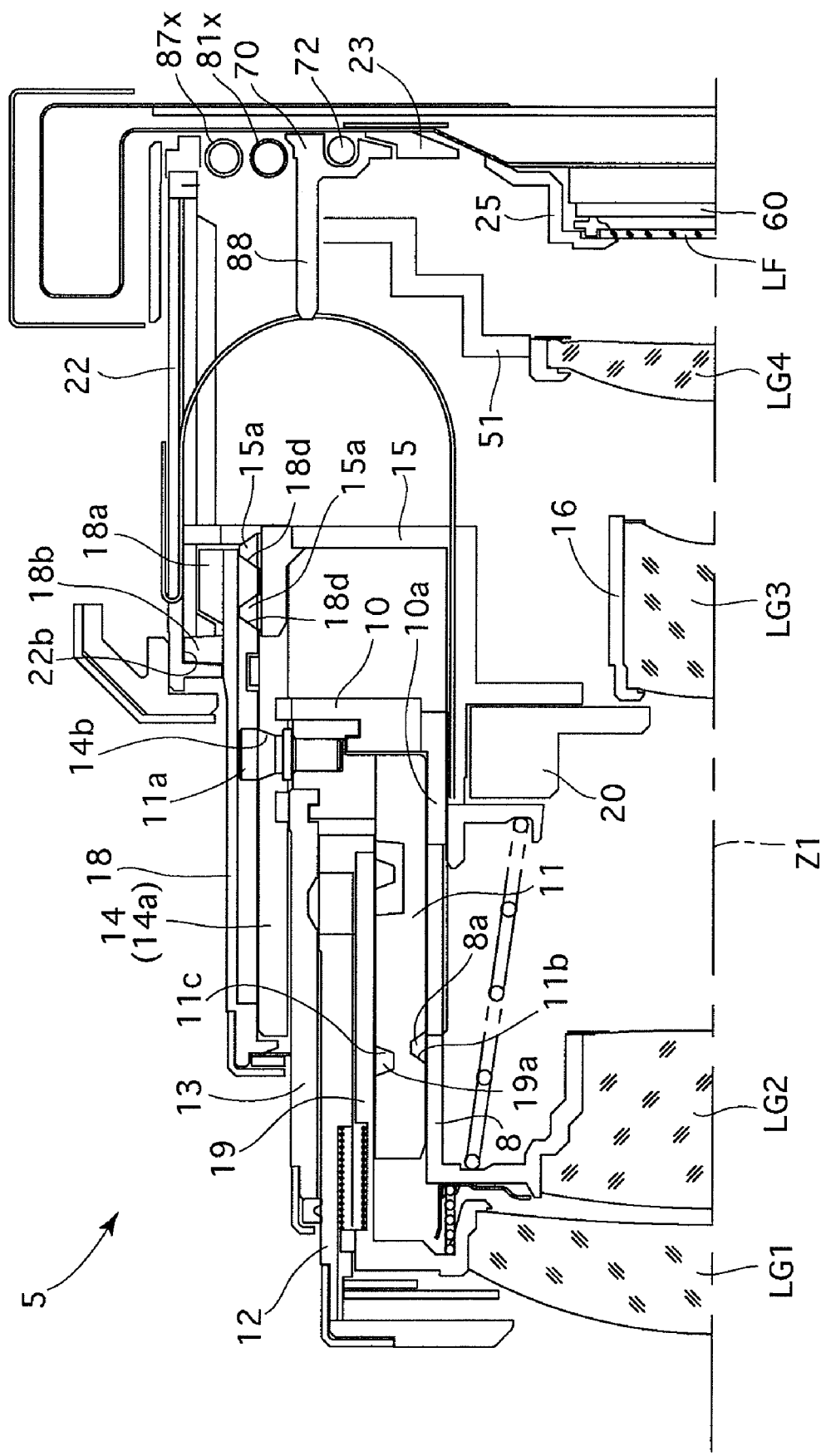
FIG. 2 is a cross sectional view of the zoom lens barrel set at the wide-angle extremity in a ready-to-photograph state.
Figure 3:
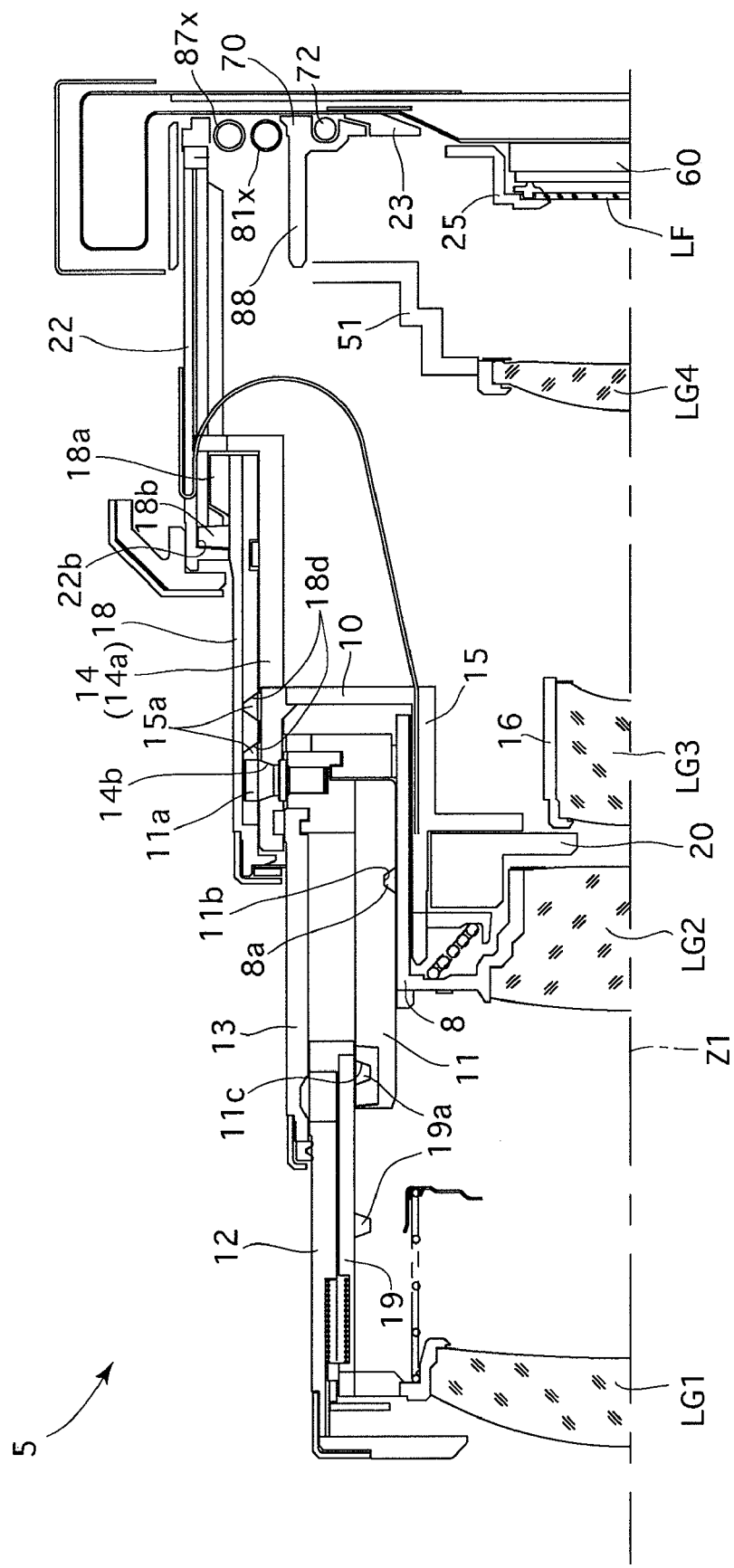
FIG. 3 is a cross sectional view of the zoom lens barrel set at the telephoto extremity in a ready-to-photograph state.

An embodiment of a zoom lens (zoom lens barrel) 5 according to the present invention is incorporated in a digital camera (imaging device). The zoom lens 5 is provided with an imaging optical system which includes a first lens group LG1, a second lens group LG2, a third lens group (radially-retractable lens group) LG3, a fourth lens group LG4, a low-pass filter (optical filter) LF and a solid-state image sensor (hereinafter referred to as an image sensor) 60, in that order from the object side in a ready-to-photograph state as shown in FIG. 2 or 3. "Z1" shown in FIGS. 1 through 3, etc., designates the optical axis of the imaging optical system that is configured as a zoom optical system. A zooming operation is carried out by moving the first lens group LG1, the second lens group LG2 and the third lens group LG3 along the optical axis Z1 in a predetermined moving manner, and a focusing operation is carried out by moving the fourth lens group LG4 along the optical axis Z1. In the following descriptions, the optical axis direction refers to a direction along or parallel to the optical axis Z1 of the imaging optical system unless otherwise stated.

The zoom lens 5 is provided on the radially outermost side thereof with a stationary barrel 22, and is further provided behind the stationary barrel 22 with an image sensor holding unit 21 fixed to the back of the stationary barrel 22. The image sensor (in-plane moving optical element) 60 is mounted on the image sensor holding unit 21 and held thereby in a manner to be movable along a plane orthogonal to the optical axis Z1. This holding structure for the image sensor 60 will be discussed later.

The zoom lens 5 is provided in the stationary barrel 22 with an AF lens frame 51 which is guided linearly in the optical axis direction, i.e., without rotating about the optical axis Z1, via an AF guide shaft 52. The AF lens frame 51 holds the fourth lens group LG4. The zoom lens 5 is provided with an AF motor 160 mounted to the stationary barrel 22 and supported thereby, and the AF lens frame 51 can move forward and rearward in the optical axis direction by an operation of the AF motor 160. The zoom lens 5 is provided with a zoom motor 150 mounted to the stationary barrel 22, and is further provided inside the stationary barrel 22 with a zoom gear 28 which is driven to rotate by the zoom motor 150.

Figure 4:
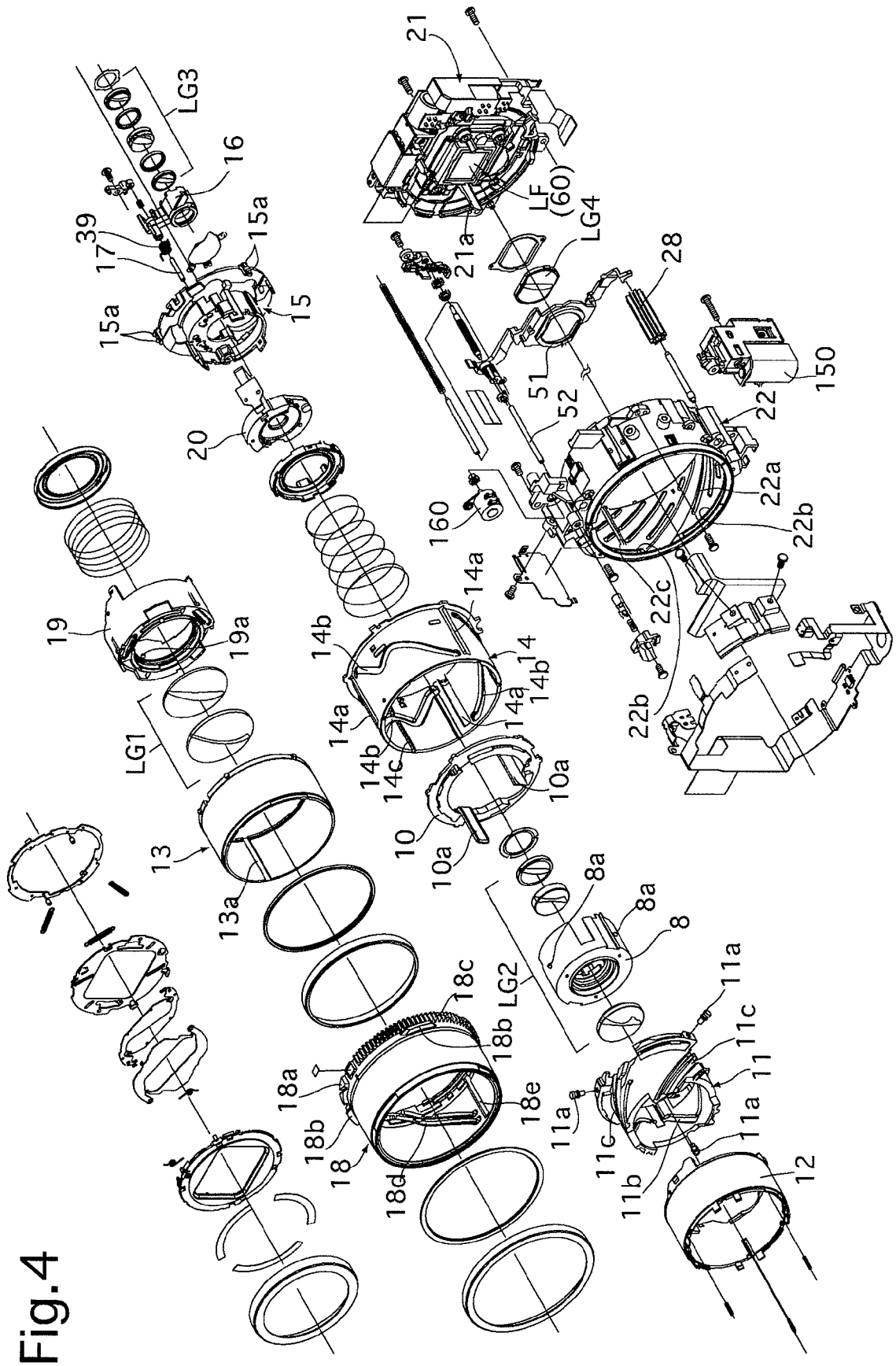
FIG. 4 is an exploded perspective view of the zoom lens barrel.

The stationary barrel 22 is provided on an inner peripheral surface thereof with an inner helicoid 22a which is inclined at a predetermined angle with respect to the optical axis Z1, and a set of three ring-shaped circumferential grooves 22b (only two of which appear in FIG. 4) which lie in a plane orthogonal to the optical axis Z1. The zoom lens 5 is provided immediately inside the stationary barrel 22 with a helicoid ring (outer external barrel/outer advancing barrel) 18, and an outer helicoid 18a formed on an outer peripheral surface of the helicoid ring 18 is engaged with the inner helicoid 22a. The helicoid ring 18 advances from and retracts into the stationary barrel 22. The helicoid ring 18 moves in the optical axis direction while rotating relative to the inner helicoid 22a while being guided by the outer helicoid 18a and the inner helicoid 22a. The helicoid ring 18 is provided on an outer peripheral surface thereof with a set of three rotation guide projections 18b (only two of which appear in FIG. 4). Upon the helicoid ring 18 advancing to a predetermined forward position, the set of three rotation guide projections 18b enter the circumferential grooves 22b, respectively. Thereupon, the helicoid ring 18 only rotates about the optical axis Z1, i.e., without moving in the optical axis direction relative to the stationary barrel 22. The helicoid ring 18 is provided on an outer peripheral surface thereof with an outer circumferential gear 18c which is in mesh with the zoom gear 28.

The zoom lens 5 is provided with a first linear guide ring 14 which is positioned inside the helicoid ring 18 and supported thereby. The first linear guide ring 14 is guided linearly in the optical axis direction relative to the stationary barrel 22 via a plurality of linear guide grooves 22c (only one of which appears in FIG. 4). The first linear guide ring 14 is coupled to the helicoid ring 18 to be rotatable relative to the helicoid ring 18 and movable integrally with the helicoid ring 18 in the optical axis direction.

The first linear guide ring 14 is provided with a set of three through-slots 14a which extend parallel to the imaging optical axis Z1. The zoom lens 5 is provided inside the helicoid ring 18 with a third lens group moving ring (axial-direction moving member) 15, and the set of three through-slots 14a guides the third lens group moving ring 15 linearly in the optical axis direction. Each through-slot 14a is formed through the first linear guide ring 14 in a radial direction thereof, and the third lens group moving ring 15 is provided with a plurality of cam followers 15a which project radially outwards from the linearly guided portions of the third lens group moving ring 15 which are slidably engaged with the through-slots 14a of the first linear guide ring 14 (see FIGS. 2 and 3). The plurality of cam followers 15a are engaged in a corresponding plurality of cam grooves 18d formed on an inner peripheral surface of the helicoid ring 18, respectively. A rotation of the helicoid ring 18 causes the third lens group moving ring 15, that is guided linearly, to move in the optical axis direction relative to the helicoid ring 18 and the first linear guide ring 14 in accordance with the contours of the plurality of cam grooves 18d.

Figure 5:
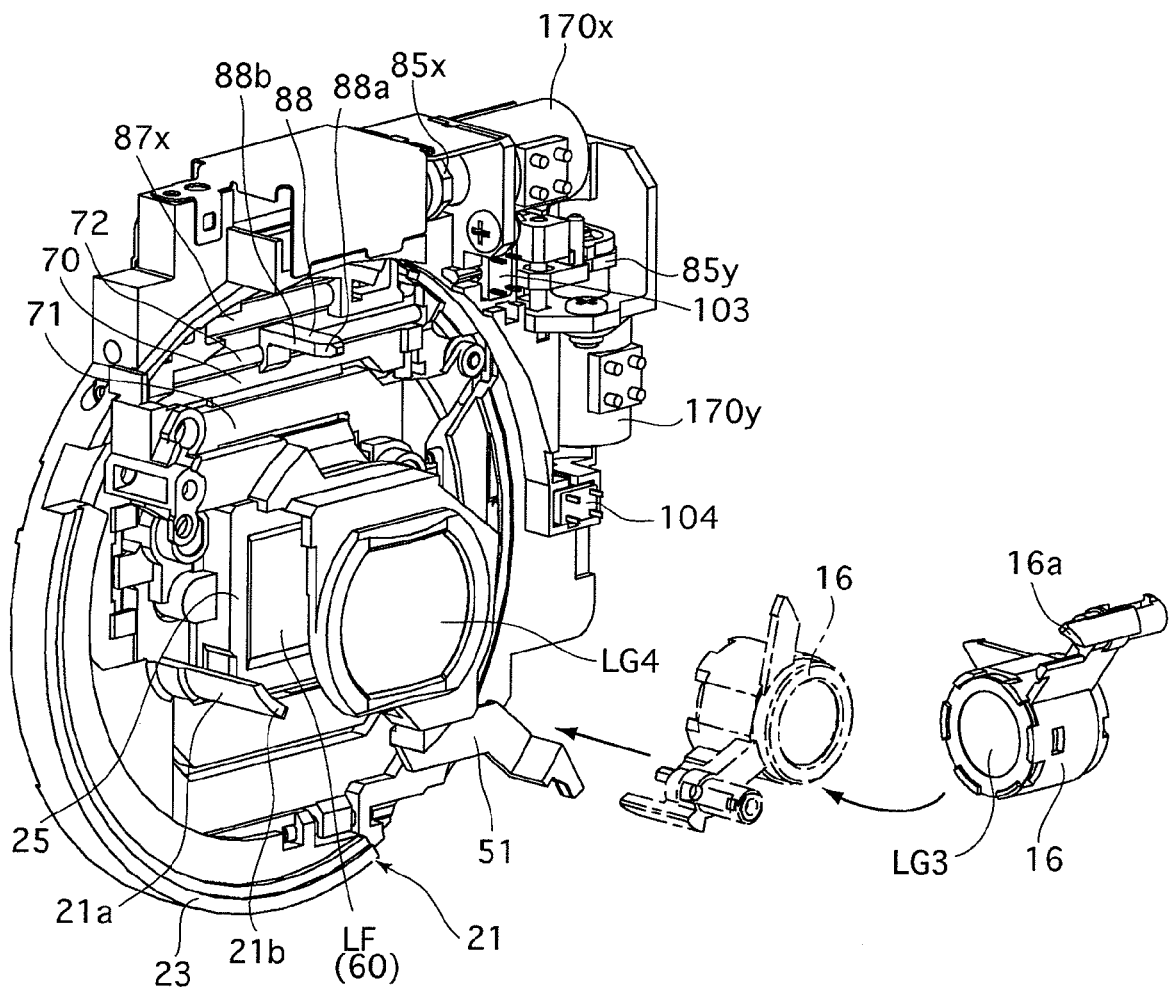
FIG. 5 is a front perspective view of an image sensor holding unit and a third lens group frame which serve as elements of the zoom lens barrel, showing the relative position therebetween.
Figure 6:
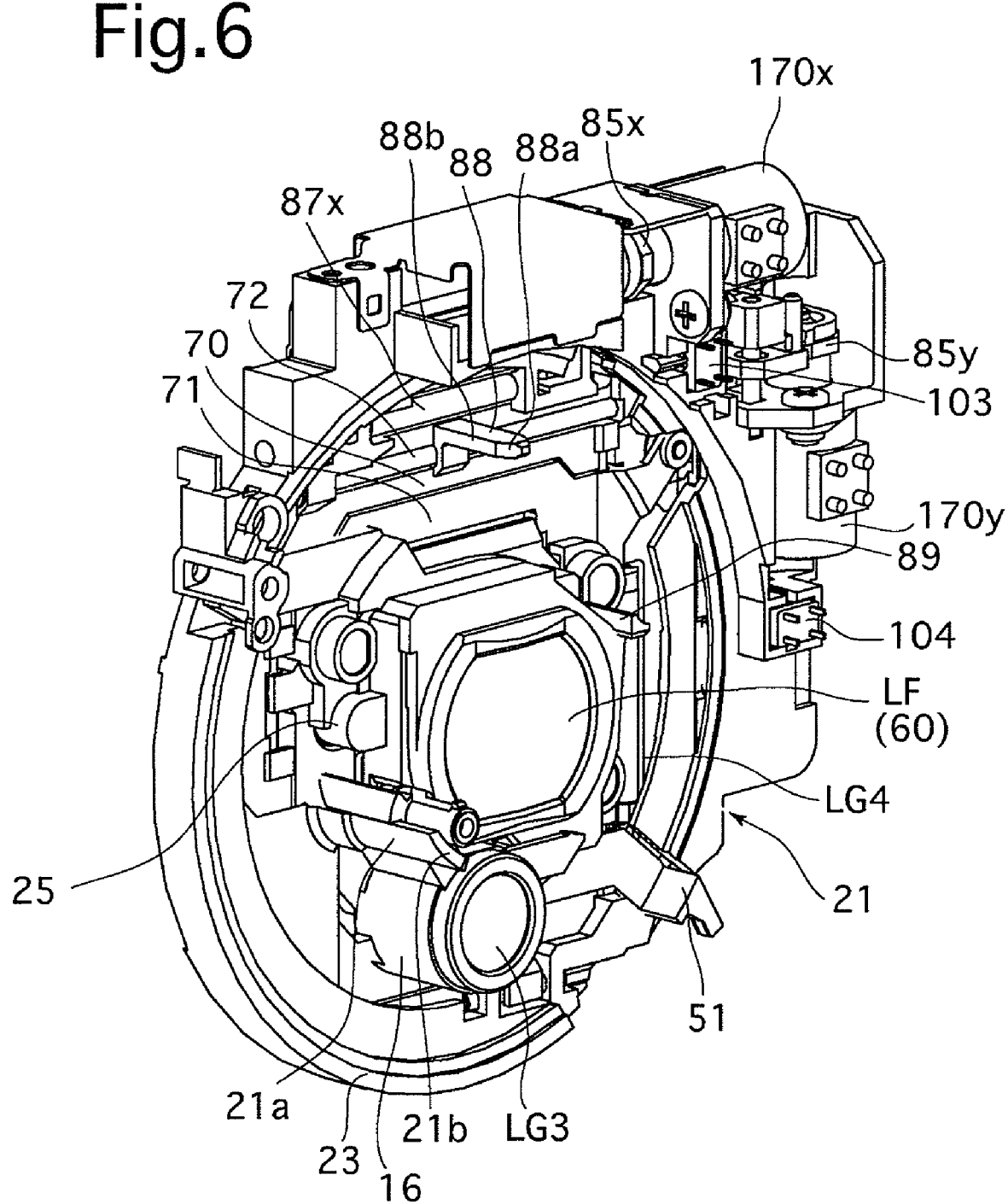
FIG. 6 is a front perspective view of the image sensor holding unit and the third lens group frame, showing a state where the third lens group frame, at an off-axis displaced position relative to the image sensor holding unit, has been retracted to the retracted position.
Figure 7:
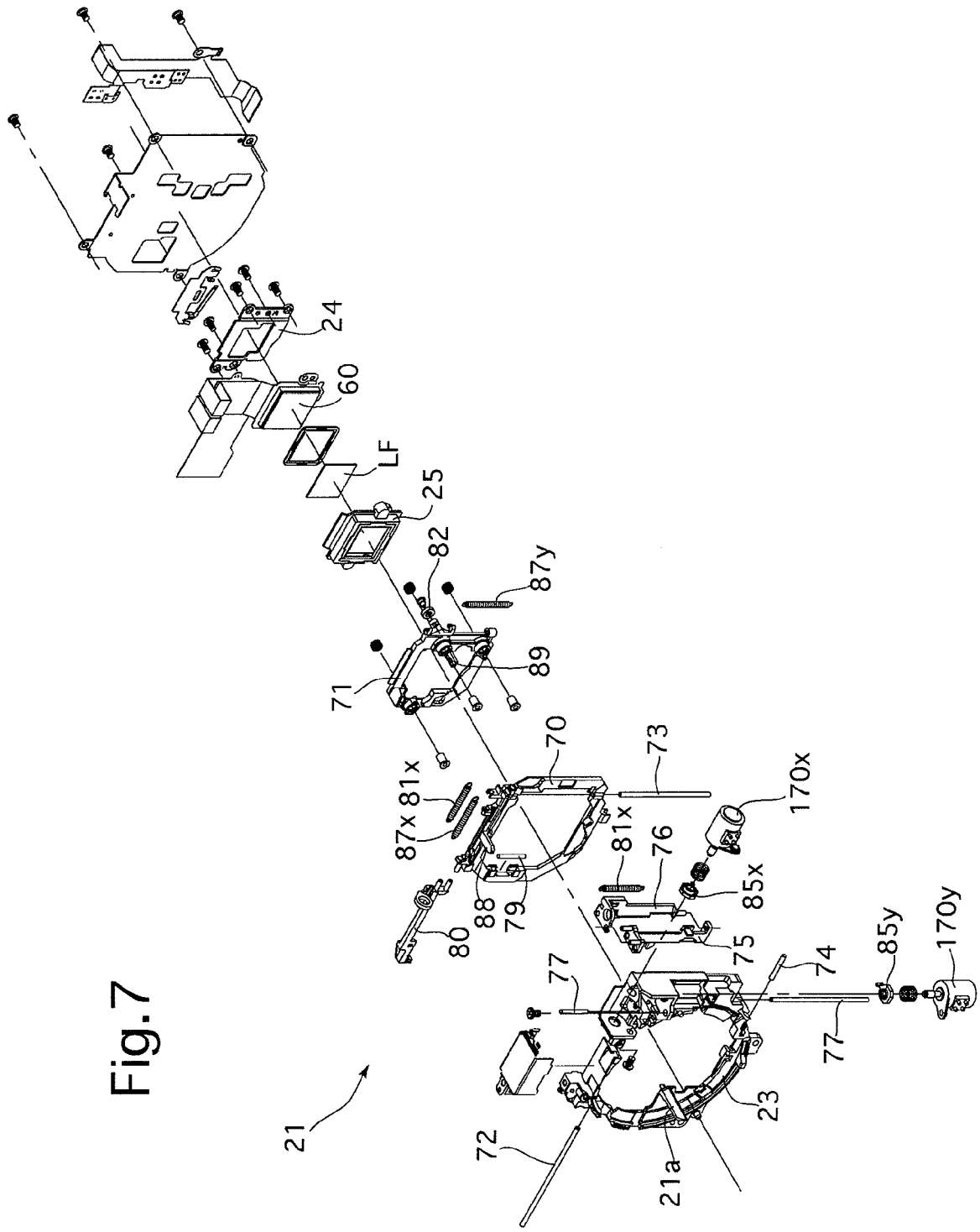
FIG. 7 is an exploded perspective view of the image sensor holding unit.

The zoom lens 5 is provided inside the third lens group moving ring 15 with a third lens group frame 16 which is pivoted on a pivot shaft 17 which extends parallel to the imaging optical axis Z1. The third lens group frame 16 is provided with a swing arm which extends radially outwards from the pivot shaft 17, and holds the third lens group LG3 at the radially outer end of the swing arm. The third lens group frame 16 is rotatable (swingable) about the pivot shaft 17 between an on-axis position (photographing position) shown in FIGS. 2 and 3 where the optical axis of the third lens group LG3 coincides with the optical axis Z1, and an off-axis displaced position (retracted away from the optical axis Z1) shown in FIG. 1 where the optical axis of the third lens group LG3 is eccentrically positioned with respect to the optical axis Z1. The third lens group frame 16 is biased to rotate in a direction toward the on-axis position by a torsion spring 39. The third lens group frame 16 is held in the on-axis position by engagement of a portion of the third lens group frame 16 with a stopper (not shown) when the zoom lens 5 is in the ready-to-photograph state (operating state). Upon the third lens group moving ring 15 moving rearward in the optical axis direction from an operating (forward) position (an axial position when the zoom lens 5 is in the ready-to-photograph state) to a retracted (rearward) position (an axial position when the zoom lens 5 is in the fully-retracted state) so as to closely approach the image sensor holding unit 21, the third lens group frame 16 comes into contact with a position-control cam bar (displacing drive device) 21a which projects forward from the image sensor holding unit 21, and the third lens group frame 16 rotates to the off-axis displaced position against the biasing force of the torsion spring 39. More specifically, as shown in FIG. 5, a cam surface 21b having a predetermined degree of inclination relative to the optical axis direction is formed on a front end surface of the position-control cam bar 21a, and a cam surface (displacing drive device) 16a, which faces the cam surface 21b when the third lens group frame 16 is in the on-axis position, is formed on the third lens group frame 16. Upon the third lens group moving ring 15 coming near to the image sensor holding unit 21 while moving rearward, the cam surfaces 21b and 16a come into contact with each other so that a component of force which rotates the third lens group frame 16 is produced from the rearward moving force in the optical axis direction, thus displacing the third lens group frame 16 to the off-axis displaced position (radially retracted position). As shown in FIG. 6, the third lens group frame 16 (the third lens group LG3) having been rotated to the off-axis displaced position is accommodated in a lower position where the third lens group frame 16 does not interfere with either the fourth lens group LG4 or the image sensor 60. In addition, the zoom lens 5 is provided inside the third lens group moving ring 15 with a shutter unit 20 which is fixed to the third lens group moving ring 15 to be positioned in front of the third lens group frame 16. Although not shown the drawings, a shutter and an adjustable diaphragm are incorporated in the shutter unit 20.

The first linear guide ring 14 is provided with a set of three roller guide slots 14b which are formed through inner and outer peripheral surfaces of the first linear guide ring 14. The zoom lens 5 is provided radially inside the first linear guide ring 14 with a cam ring 11 rotatable about the optical axis Z1. A set of three guide rollers (followers) 11a fixed to the cam ring 11 at different circumferential positions thereon to project radially outwards are slidably engaged in the set of three roller guide slots 14b, respectively. The set of three guide rollers 11a extend radially outwards from the set of three roller guide slots 14b therethrough to be engaged in a set of three rotation transfer grooves 18e which are formed on an inner peripheral surface of the helicoid ring 18 to extend parallel to the optical axis Z1, respectively, so that the cam ring 11 rotates integrally with the helicoid ring 18. The cam ring 11 moves in the optical axis direction while rotating relative to the first linear guide ring 14 in accordance with contours of the set of three roller guide slots 14b, in which the set of three guide rollers 11a are engaged, respectively.

Rotating the zoom gear 28 by the zoom motor 150 in a lens barrel advancing direction causes the helicoid ring 18 to advance while rotating due to the engagement of the inner helicoid 22a with the outer helicoid 18a. This advancing and rotating movement of the helicoid ring 18 causes the first linear guide ring 14 to move linearly forward with the helicoid ring 18. Thereupon, the third lens group moving ring 15 that is guided linearly by the first linear guide ring 14 moves in the optical axis direction in accordance with the contours of the plurality of cam grooves 18d of the helicoid ring 18. Namely, the third lens group moving ring 15 is moved forward in the optical axis direction by an amount of movement corresponding to the sum of the amount of the forward movement of the helicoid ring 18 (while it rotates) and the amount of the forward movement of the third lens group moving ring 15 relative to the helicoid ring 18 and the first linear guide ring 14 according to the plurality of cam grooves 18d. Additionally, rotation of the helicoid ring 18 is transferred to the cam ring 11 via a set of three rotation transfer grooves 18e formed on an inner peripheral surface of the helicoid ring 18 and the set of three guide rollers 11a of the cam ring 11. Since the set of three guide rollers 11a are also engaged in the set of three roller guide slots 14b, respectively, the cam ring 11 moves in the optical axis direction while rotating relative to the first linear guide ring 14 in accordance with the contours of the set of three roller guide slots 14b. Since the first linear guide ring 14 itself also moves linearly forward with the helicoid ring 18 as described above, the cam ring 11 eventually moves forward in the optical axis direction by an amount of movement corresponding to the sum of the amount of the forward linear movement of the first linear guide ring 14 and the amount of the forward movement of the cam ring 11 relative to the first linear guide ring 14 (relative to the helicoid ring 18) via the set of three roller guide slots 14b.

The above described advancing operation is performed only while the outer helicoid 18a of the helicoid ring 18 and the inner helicoid 22a of the stationary barrel 22 are engaged with each other. Upon the helicoid ring 18 and the first linear guide ring 14 being moved forward by a predetermined amount of movement, the outer helicoid 18a and the inner helicoid 22a are disengaged from each other. Thereupon, the set of three rotation guide projections 18b are respectively engaged in the set of three circumferential grooves 22b, so that the helicoid ring 18 only rotates at an axially fixed position in the optical axis direction, i.e., without moving in the optical axis direction relative to the stationary barrel 22. Following the engagement of the set of three rotation guide projections 18b with the set of three circumferential grooves 22b, the first linear guide ring 14 is also stopped at a fixed front advanced position in the optical axis direction. The cam ring 11 moves in the optical axis direction while being guided by the set of three roller guide slots 14b via the set of three guide rollers 11a in accordance with rotation of the helicoid ring 18 even after the helicoid ring 18 comes into a state in which the helicoid ring 18 rotates at the aforementioned axially fixed position.

The linear guide ring 14 is provided on an inner peripheral surface thereof with a plurality of linear guide grooves 14c which extend parallel to the optical axis Z1, independently of the set of three through-slots 14a that are for guiding the third lens group moving ring 15 linearly in the optical axis direction. The zoom lens 5 is provided inside the first linear guide ring 14 with a second linear guide ring 10 and a middle external barrel (middle advancing barrel) 13, each of which is guided linearly in the optical axis direction by the plurality of linear guide grooves 14c. The middle external barrel 13 advances from and retracts into the helicoid ring 18.

The second linear guide ring 10 is coupled to the cam ring 11 so as to be capable of rotating about the optical axis Z1 relative to the cam ring 11 and to be movable integrally with the cam ring 11 in the optical axis direction. The zoom lens 5 is provided inside the cam ring 11 with a second lens group holding ring 8 which indirectly supports and holds the second lens group LG2. The second lens group holding ring 8 is guided linearly in the optical axis direction by a pair of key projections 10a formed on the second linear guide ring 10 to extend forward in the optical axis direction. The second lens group holding ring 8 is provided on an outer peripheral surface thereof with a set of three cam followers 8a which are respectively engaged in a set of three second lens group guide grooves 11b (only two of which appear in FIG. 4) formed on an inner peripheral surface of the cam ring 11. A rotation of the cam ring 11 causes the second lens group moving ring 8 to move linearly in the optical axis direction due to the engagement of the set of three second lens group guide grooves 11b with the set of three cam followers 8a.

The middle external barrel 13 is provided on an inner peripheral surface thereof with a set of three linear guide grooves 13a (only one of which appears in FIG. 4) which are formed to extend parallel to the optical axis Z1. The zoom lens 5 is provided immediately inside the middle external barrel 13 with a frontmost external barrel (innermost advancing barrel) 12 which advances from and retracts into the middle external barrel 13. The frontmost external barrel 12 is guided linearly in the optical axis direction by the set of three linear guide grooves 13a. The zoom lens 5 is provided inside the frontmost external barrel 12 with a first lens group holding ring 19 which holds the first lens group LG1. The first lens group holding ring 19 is prevented from rotating relative to the frontmost external barrel 12 and allowed to move in the optical axis direction relative to the frontmost external barrel 12. The first lens group holding ring 19 is provided on an inner peripheral surface thereof with a set of three cam followers 19a (only one of which appears in FIG. 4) which are respectively engaged in a set of three first lens group guiding cam grooves 11c (only two of which appear in FIG. 4) formed on an outer peripheral surface of the cam ring 11. A rotation of the cam ring 11 causes the first lens group holding ring 19 to move in the optical axis direction due to the engagement between the set of three first lens group guiding cam grooves 11c and the set of three cam followers 19a.

An advancing operation and a retracting operation of the zoom lens 5 that has the above described structure will be discussed hereinafter. Since operations of the stages from the stationary barrel 22 until and including the cam ring 11 (including the helicoid ring 18 and the first linear guide ring 14) have already been discussed above, further explanations thereof are omitted hereinafter. Rotating the zoom gear 28 in the lens barrel advancing direction via the zoom motor 150 from the fully-retracted state of the zoom lens 5 shown in FIG. 1 causes the helicoid ring 18 to move forward while rotating relative to the stationary barrel 22. Each of the helicoid ring 18 and the first linear guide ring 14 stops moving in the optical axis direction upon being advanced to a predetermined forward position thereof, and thereafter the helicoid ring 18 rotates at the axial fixed position due to the engagement of the set of three rotation guide projections 18b with the circumferential groove 22b.

The third lens group moving ring 15 that is guided linearly in the optical axis direction by the first linear guide ring 14 moves in the optical axis direction in a predetermined moving manner relative to the helicoid ring 18 in accordance with a forward movement of the helicoid ring 18 (as the helicoid ring 18 rotates) while being guided by the plurality of cam grooves 18d. The third lens group moving ring 15 moves forward, away from the image sensor holding unit 21, by an amount of movement corresponding the sum of the forward movement of the third lens group moving ring 15 relative to the helicoid ring 18 and the forward movement of the helicoid ring 18 itself (while rotating) when the zoom lens 5 moves from the fully-retracted state to the ready-to-photograph state (the wide-angle extremity state shown in FIG. 2). More specifically, in the state shown in FIG. 1, in which the zoom lens 5 is in the fully-retracted state, the third lens group frame 16, which is positioned inside the third lens group moving ring 15, is held at the off-axis displaced position, in which the optical axis of the third lens group LG3 is eccentricity positioned downward from the optical axis Z1, by the position-control cam bar 21a that is formed to project forward from the image sensor holding unit 21 (see FIG. 6). Additionally, during the course of movement of the third lens group moving ring 15 from the retracted position (rearward position) to the wide-angle extremity position (forward position/operating position) in the zooming range, the third lens group frame 16 is disengaged from the position-control cam bar 21a to rotate about the pivot shaft 17 from the off-axis displaced position to the on-axis position where the optical axis of the third lens group LG3 coincides with the optical axis Z1 via the spring force of the torsion spring 39. Subsequently, the third lens group frame 16 remains held in the on-axis position until the zoom lens 5 is retracted to the fully-retracted position (the position shown in FIG. 1).

The cam ring 11 moves in the optical axis direction relative to the helicoid ring 18 while rotating with the helicoid ring 18 while being guided by the set of three roller guide slots 14b of the first linear guide ring 14 in accordance with a forward movement of the helicoid ring 18 (as the helicoid ring 18 rotates). The rotation of the cam ring 11 causes the second lens group holding ring 8, which is positioned inside the cam ring 11 and guided linearly in the optical axis direction via the second linear guide ring 10, to move in the optical axis direction in a predetermined moving manner due to the engagement of the set of three cam followers 8a with the set of three second lens group guide grooves 11b. In addition, the rotation of the cam ring 11 causes a combination of the frontmost external barrel 12 and the first lens group holding ring 19, which is guided linearly in the optical axis direction via the middle external barrel 13, to move in the optical axis direction in a predetermined moving manner due to the engagement of the set of three cam followers 19a with the set of three first lens group guiding cam grooves 11c.

Therefore, an axial position of the first lens group LG1 relative to an imaging surface (light-receiving surface) of the image sensor 60 when the first lens group LG1 is moved forward from the retracted position is determined by the sum of the amount of forward movement of the cam ring 11 relative to the stationary barrel 22 and the amount of movement (caused by the set of three first lens group guiding cam grooves 11c of the cam ring 11) of a combination of the frontmost external barrel 12 and the first lens group holding ring 19 relative to the cam ring 11. An axial position of the second lens group LG2 relative to the imaging surface of the image sensor 60 when the second lens group LG2 is moved forward from the retracted position is determined by the sum of the amount of forward movement of the cam ring 11 relative to the stationary barrel 22 and the amount of movement (caused by the set of three second lens group guide grooves 11b of the cam ring 11) of the second lens group holding ring 8 relative to the cam ring 11. An axial position of the third lens group LG3 relative to the imaging surface (light-receiving surface) of the image sensor 60 when the third lens group LG3 is moved forward from the retracted position is determined by the sum of the amount of forward movement of the helicoid ring 18 relative to the stationary barrel 22 and the amount of movement (caused by the plurality of cam grooves 18d of the helicoid ring 18) of the third lens group moving ring 15 relative to the helicoid ring 18.

A zooming operation is carried out by moving the first, second and third lens groups LG1, LG2 and LG3 on the optical axis Z1 while changing the air-distances therebetween. When the zoom lens 5 is driven to advance from the fully-retracted state shown in FIG. 1, the zoom lens 5 firstly extends into the state shown in FIG. 2, in which the zoom lens 5 is set at the wide-angle extremity. Subsequently, the zoom lens 5 moves into (arrives at) the state shown in FIG. 3, in which the zoom lens 5 is set at the telephoto extremity as shown in FIG. 3 by a further rotation of the zoom motor 150 in a lens barrel advancing direction thereof.

When the first through fourth lens groups LG1, LG2, LG3 and LG4 are positioned in the zooming range (i.e., when the zoom lens 5 is in the ready-to-photograph state), a focusing operation is carried out by moving the fourth lens group L4 (the AF lens frame 51) along the optical axis Z1 by rotation of the AF motor 160 in accordance with an object distance.

Driving the zoom motor 150 in a lens barrel retracting direction causes the zoom lens 5 to operate in the reverse manner to the above described advancing operation, so that each annular movable member of the zoom lens 5 is moved rearward in the optical axis direction. During the course of this retracting movement of the zoom lens 5, the third lens group frame 16 rotates about the pivot shaft 17 to the off-axis displaced position via the position-control cam bar 21a while moving rearward with the third lens group moving ring 15. When the third lens group moving ring 15 is retracted to the retracted position (rearward position) shown in FIG. 1, the third lens group LG3 is accommodated into space radially outside the space in which the fourth lens group LG4, the low-pass filter LF and the image sensor 60 are retracted as shown in FIG. 1 (i.e., the third lens group LG3 is radially retracted into an axial range substantially the same as an axial range in the optical axis direction of the fourth lens group LG4, the low-pass filter LF and the CCD image sensor 60). This structure of the zoom lens 5 for retracting (displacing) the third lens group LG3 in this manner reduces the length of the zoom lens 5 when the zoom lens 5 is fully retracted.

The image sensor holding unit 21 of the zoom lens 5 is equipped with an image stabilizer (shake reduction system) which drives the image sensor 60. This image stabilizer moves the image sensor 60 in a plane orthogonal to the optical axis Z1 to counteract image shake of an object image captured by the image sensor 60 in accordance with the magnitude and the direction of vibration (hand shake) applied to the digital camera (not shown) which is equipped with the zoom lens 5. This control is performed by a control circuit (controller) 102 (see FIG. 13) of the digital camera.

FIGS. 7 through 10 show the detailed structure of the image sensor holding unit 21. The image sensor holding unit 21 is provided with a stationary holder (stationary member) 23 which has an opening at the center thereof. The position-control cam bar 21a, that functions so as to move the third lens group frame 16 from the on-axis position to the off-axis displaced position, is formed on the stationary holder 23 to project therefrom. The stationary holder 23 is provided with a pair of X-direction guide rods (guide mechanism) 72 and 74, the axes of which extend in the lateral direction (hereinafter referred to as X-direction), and an X-direction moving stage (first moving stage) 70 is slidably engaged with the pair of X-direction guide rods 72 and 74 and supported thereby to be freely movable in the X-direction. The X-direction moving stage 70 is provided thereon with a pair of Y-direction guide rods (guide mechanism) 73 and 79, the axes of which extend in the vertical direction (hereinafter referred to as Y-direction), and a Y-direction moving stage (second moving stage) 71 is slidably engaged with the pair of Y-direction guide rods 73 and 79 and supported thereby to be freely movable in the Y-direction. The image sensor 60 and the low-pass filter LF are supported on the Y-direction moving stage 71 in a manner so as to be sandwiched between a sensor support plate 24 and a filter holder 25. Accordingly, the image sensor 60 is supported by the stationary holder 23 via the X-direction moving stage 70 and the Y-direction moving stage 71 to be movable in two axial (X-axis and Y-axis) directions orthogonal to each other in a plane orthogonal to the optical axis Z1. In other words, the X-direction moving stage 70 and the Y-direction moving stage 71 constitute a combined moving stage for supporting the image sensor 60.

The image sensor holding unit 21 is provided with a biasing spring (biasing member) 87x which is installed between the X-direction moving stage 70 and the stationary holder 23 so as to be extended in the X-direction. The biasing spring 87x is an extension coil spring and biases the X-direction moving stage 70 rightward with respect to FIG. 10. The image sensor holding unit 21 is provided with a biasing spring (biasing member) 87y which is installed between the X-direction moving stage 70 and the Y-direction moving stage 71 so as to be extended in the Y-direction. The biasing spring 87y is an extension coil spring and biases the Y-direction moving stage 71 downward with respect to FIG. 10.

Figure 9:
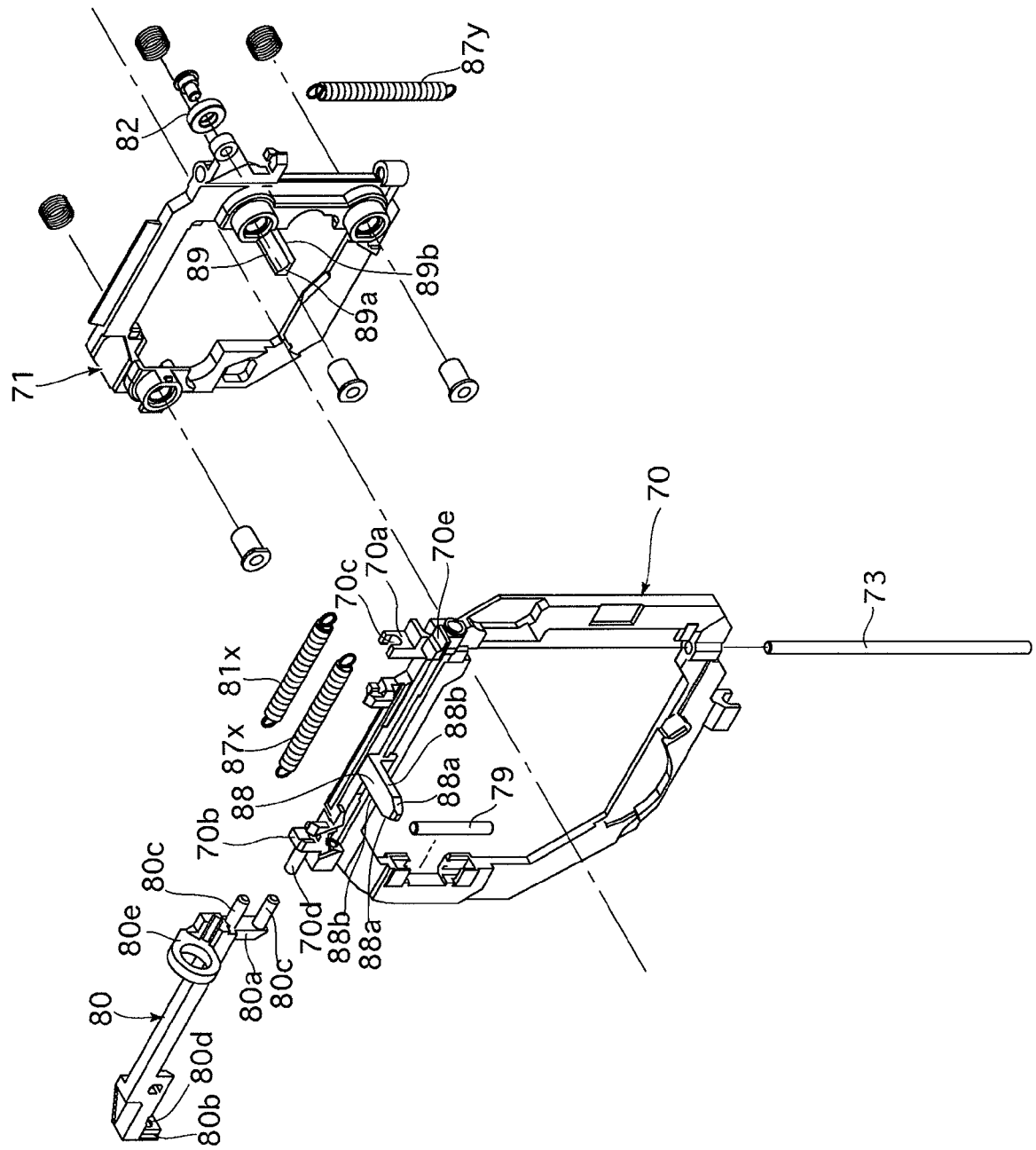
FIG. 9 is an enlarged exploded perspective view of another portion of the image sensor holding unit shown in FIG. 7.

The image sensor holding unit 21 is provided above the X-direction moving stage 70 with an X-direction moving member 80 which is supported by the X-direction moving stage 70. The X-direction moving member 80 is elongated in the X-direction and provided in the vicinity of the laterally opposite ends of the X-direction moving member 80 with a movement limit lug 80a and a movement limit lug 80b, respectively. The X-direction moving member 80 is further provided with a pair of guide pins 80c which project laterally from the movement limit lug 80a and extend parallel to each other, and the movement limit lug 80b is provided with a guide hole 80d. The X-direction moving member 80 is further provided in the vicinity of the movement limit lug 80a with a nut contacting portion 80e. The X-direction moving stage 70 is provided with a movement limit lug 70a and a movement limit lug 70b which face the movement limit lug 80a and the movement limit lug 80b of the X-direction moving member 80, respectively. The movement limit lug 70a is provided with a pair of guide holes 70c (the upper hole of which is formed like a groove as shown in FIG. 9; the lower hole of which does not appear in FIG. 9) in which the pair of guide pins 80c are freely slidably engaged, respectively, while the movement limit lug 70b is provided with a guide pin 70d which extends laterally to be slidably engaged in the guide hole 80d. The X-direction moving stage 70 and the X-direction moving member 80 are guided to be movable relative to each other in the X-direction by the engagement of the pair of guide pins 80c with the pair of guide holes 70c and the engagement of the guide pin 70d with the guide hole 80d. The image sensor holding unit 21 is provided with an extension spring (joining spring) 81x which is installed between the X-direction moving stage 70 and the X-direction moving member 80 so as to be extended in the X-direction. The extension spring 81x biases the X-direction moving stage 70 and the X-direction moving member 80 in opposite directions to bring the movement limit lug 80a and the movement limit lug 70a into contact with each other and to bring the movement limit lug 80b and the movement limit lug 70b into contact with each other.

Figure 8:
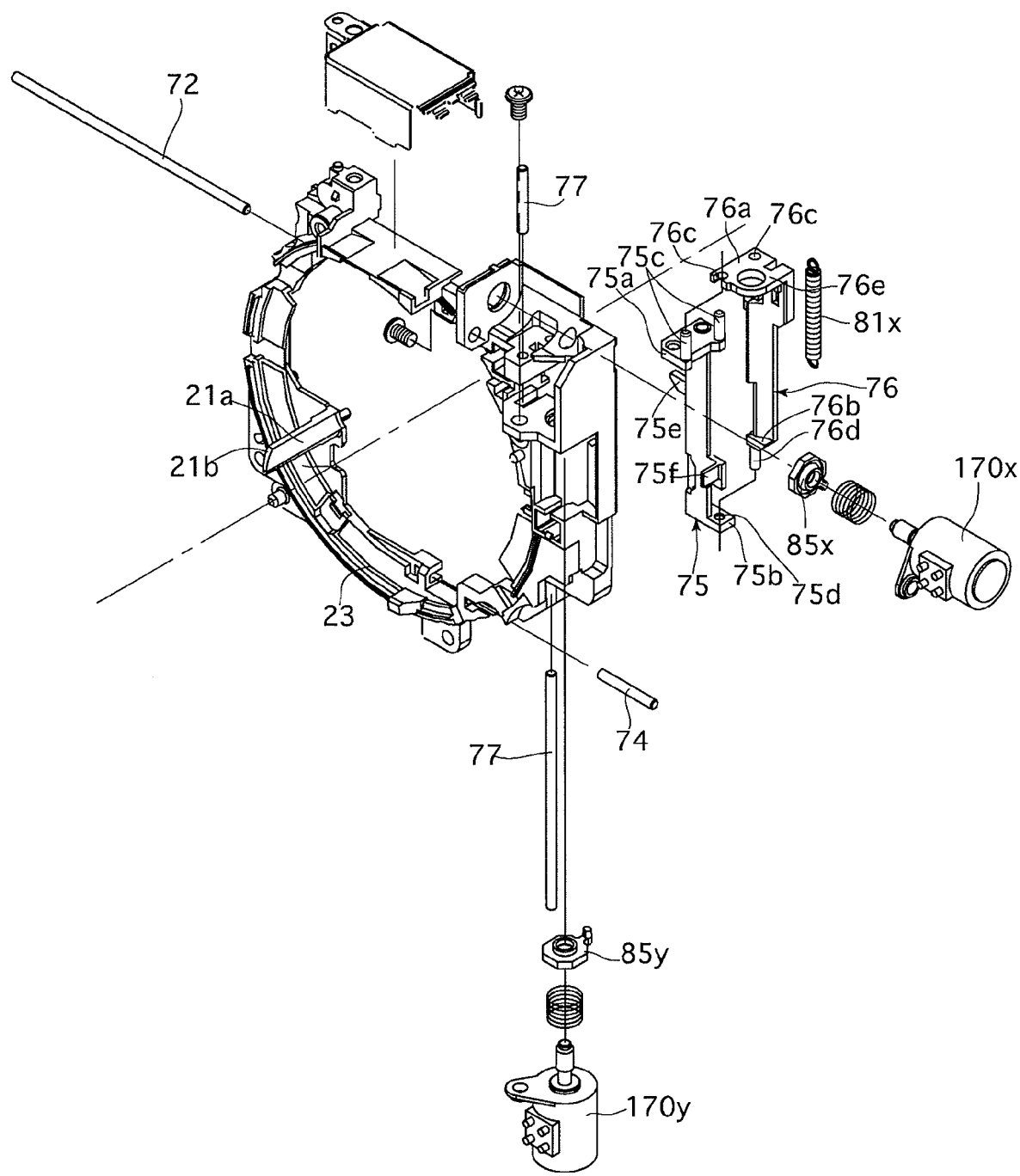
FIG. 8 is an enlarged exploded perspective view of a portion of the image sensor holding unit shown in FIG. 7.

A pair of Y-direction guide rods 77 are provided as separate elements from the pair of Y-direction guide rods 73 and 79, extend in the Y-direction and are fixed to the stationary holder 23. The image sensor holding unit 21 is provided with a first Y-direction moving member 75 which is supported by the pair of Y-direction guide rods 77 to be freely movable in the Y-direction. The first Y-direction moving member 75 is elongated in the Y-direction and provided, in the vicinity of the opposite ends of the first Y-direction moving member 75 in the Y-direction, with a movement limit lug 75a and a movement limit lug 75b, respectively. The first Y-direction moving member 75 is further provided with a pair of guide pins 75c which project vertically from the movement limit lug 75a to extend parallel to each other, and the movement limit lug 75b is provided with a guide hole 75d. The first Y-direction moving member 75 is further provided with a linkage projection (stopper) 75e which projects in the X-direction. The image sensor holding unit 21 is provided in the vicinity of the first Y-direction moving member 75 with a second Y-direction moving member 76. The second Y-direction moving member 76 is provided with a movement limit lug 76a and a movement limit lug 76b which are separate from each other in the Y-direction. The movement limit lug 76a is provided with a pair of guide holes 76c (the front hole of which is formed like a groove as shown in FIG. 8) in which the pair of guide pins 75c of the first Y-direction moving member 75 are freely and slidably engaged, respectively, while the movement limit lug 76b is provided with a guide pin 76d which extends downward to be freely and slidably engaged in the guide hole 75d of the first Y-direction moving member 75. The first Y-direction moving member 75 and the second Y-direction moving member 76 are guided to be movable relative to each other in the Y-direction by the engagement of the pair of guide pins 75c with the pair of guide holes 76c and the engagement of the guide pin 76d with the guide hole 75d. The image sensor holding unit 21 is provided with an extension spring (joining spring) 81y which is installed between the first Y-direction moving stage 75 and the second Y-direction moving member 76 so as to be extended in the Y-direction. The extension spring 81y biases the first Y-direction moving stage 75 and the second Y-direction moving member 76 in opposite directions to bring the movement limit lug 75a and the movement limit lug 76a into contact with each other and to bring the movement limit lug 75b and the movement limit lug 76b into contact with each other.

The linkage projection 75e of the first Y-direction moving member 75 is in contact with a transfer roller 82 mounted on the Y-direction moving stage 71 so that a moving force in the Y-direction is transferred from the first Y-direction moving member 75 to the Y-direction moving stage 71 via the contacting engagement between the linkage projection 75e and the transfer roller 82. The transfer roller 82 is supported by a rotation pin so that the transfer roller 82 is rotatable about an axis which is parallel to the optical axis Z1. When the Y-direction moving stage 71 moves with the X-direction moving stage 70 in the X-direction, the transfer roller 82 rolls on a contacting surface of the linkage projection 75e. Since this contacting surface of the linkage projection 75e is a flat surface elongated in the X-direction, the Y-direction moving stage 71 can be moved in the X-direction with no driving force in the X-direction being exerted on the first Y-direction moving member 75 by allowing the transfer roller 82 to roll on the contacting surface of the linkage projection 75e.

The image sensor holding unit 21 is provided with a motor-powered controller which includes the control circuit 102, an X-direction drive motor 170x serving as a drive source for driving the image sensor 60 in the X-direction and a Y-direction drive motor 170y serving as a drive source for driving the image sensor 60 in the Y-direction. The X-direction drive motor 170x and the Y-direction drive motor 170y are supported by the stationary holder 23. The X-direction drive motor 170x and the Y-direction drive motor 170y are both stepping motors. A drive shaft (rotary shaft) of the X-direction drive motor 170x is threaded to serve as a feed screw, and a drive shaft (rotary shaft) of the Y-direction drive motor 170y is threaded to serve as a feed screw. The drive shaft (feed screw) of the X-direction drive motor 170x is screwed into a female screw hole of an X-direction driven nut (stopper) 85x, and the drive shaft (feed screw) of the Y-direction drive motor 170y is screwed into a female screw hole of a Y-direction driven nut (stopper) 85y. The X-direction driven nut 85x is guided linearly in the X-direction, and is in contact with the nut contacting portion 80e of the X-direction moving member 80. The Y-direction driven nut 85y is guided linearly in the Y-direction, and is in contact with the nut contacting portion 76e of the second Y-direction moving member 76.

Figure 10:
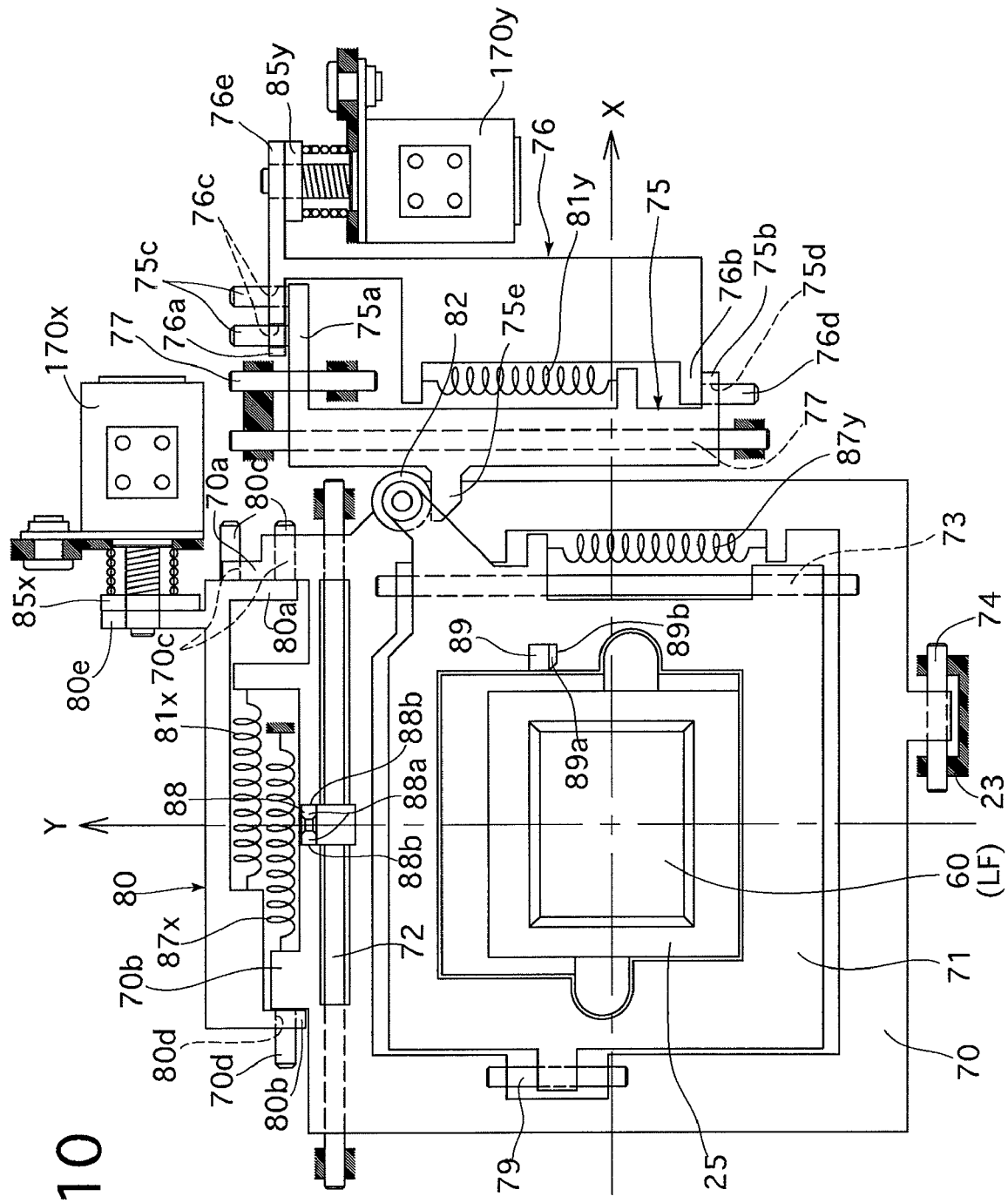
FIG. 10 is a front elevational view of main elements of the image sensor holding unit.

As shown in FIG. 10, in the driving mechanism for driving the image sensor 60 in the Y-direction, the first Y-direction moving member 75 and the second Y-direction moving member 76 are coupled to each other resiliently by the biasing force of the extension spring 81y with the movement limit lug 75a and the movement limit lug 75b in contact with the movement limit lug 76a and the movement limit lug 76b, respectively. The biasing force of the Y-direction stage biasing spring 87y is exerted on the first Y-direction moving member 75 via the transfer roller 82, which is in contact with the linkage projection 75e. Although the biasing force of the Y-direction stage biasing spring 87y is exerted on the first Y-direction moving member 75 downward with respect to in FIG. 10, i.e., in a direction to disengage the movement limit lugs 75a and 75b from the movement limit lugs 76a and 76b, respectively, the biasing force of the extension spring 81y is predetermined to be greater than that of the Y-direction stage biasing spring 87y. Therefore, the first Y-direction moving member 75 and the second Y-direction moving member 76 are collectively biased downward with respect to FIG. 10 while maintaining the movement limit lugs 75a and 75b in resilient contact with the movement limit lugs 76a and 76b, respectively. Since the downward movement of the second Y-direction moving member 76 is limited by the engagement of the nut contacting portion 76e with the Y-direction driven nut 85y, the positions of the first Y-direction moving member 75 and the second Y-direction moving member 76 in the Y-direction are determined by the position of the Y-direction driven nut 85y.

Driving the Y-direction drive motor 170y to rotate the drive shaft thereof causes the Y-direction driven nut 85y to move linearly in the Y-direction, thus causing the position of the first Y-direction moving member 75 and the second Y-direction moving member 76 in the Y-direction to vary. For instance, if the Y-direction driven nut 85y is moved upward with respect to FIG. 10, the Y-direction driven nut 85y presses the nut contacting portion 76e in the same direction to thereby integrally move the first Y-direction moving member 75 and the second Y-direction moving member 76 upward with respect to FIG. 10 against the spring force of the Y-direction stage biasing spring 87y. If the first Y-direction moving member 75 is moved upward with respect to FIG. 10, the linkage projection 75e presses the transfer roller 82 in the same direction to thereby move the Y-direction moving stage 71 upward with respect to FIG. 10. Conversely, if the Y-direction driven nut 85y is moved downward with respect to FIG. 10, the first Y-direction moving member 75 and the second Y-direction moving member 76 follow the Y-direction driven nut 85y to integrally move downward with respect to FIG. 10 by the biasing force of the Y-direction stage biasing spring 87y. At this time, the Y-direction moving stage 71 follows the first Y-direction moving member 75 to move downward with respect to FIG. 10 by the biasing force of the Y-direction stage biasing spring 87y. The linkage projection 75e and the transfer roller 82 are maintained in contact with each other at all times by the biasing force of the Y-direction stage biasing spring 87y.

In the driving mechanism for driving the image sensor 60 in the X-direction, the X-direction moving stage 70 and the X-direction moving member 80 are resiliently coupled to each other via the extension spring 81x with the movement limit lugs 70a and 70b being in contact with the movement limit lugs 80a and 80b, respectively. Although the X-direction moving stage 70 is biased rightward with respect to FIG. 10 by the spring force of the X-direction stage biasing spring 87x, i.e., in a direction to disengage the movement limit lugs 70a and 70b from the movement limit lugs 80a and 80b, respectively, the biasing force of the extension spring 81x is predetermined to be greater than that of the X-direction stage biasing spring 87x. Therefore, the X-direction moving stage 70 and the X-direction moving member 80 are collectively biased rightward while maintaining the movement limit lugs 70a and 70b in resilient contact with the movement limit lugs 80a and 80b, respectively. Since the rightward movement of the X-direction moving member 80 is limited by the engagement of the nut contacting portion 80e with the X-direction driven nut 85x, the positions of the X-direction moving member 80 and the X-direction moving stage 70 in the X-direction are determined by the position of the X-direction driven nut 85x.

Driving the X-direction drive motor 170x to rotate the drive shaft thereof causes the X-direction driven nut 85x to move linearly in the X-direction, thus causing the position of the X-direction moving stage 70 and the X-direction moving member 80 in the X-direction to vary. For instance, if the X-direction driven nut 85x is moved leftward with respect to FIG. 10, the X-direction driven nut 85x presses the nut contacting portion 80e in the same direction to thereby integrally move the X-direction moving stage 70 and the X-direction moving member 80 leftward with respect to FIG. 10 against the spring force of the X-direction stage biasing spring 87x. Conversely, if the X-direction driven nut 85x is moved rightward with respect to FIG. 10, the X-direction moving stage 70 and the X-direction moving member 80 follow the X-direction driven nut 85x to integrally move rightward by the biasing force of the X-direction stage biasing spring 87x.

When the X-direction moving stage 70 moves in the X-direction, the Y-direction moving stage 71 that is supported by the X-direction moving stage 70 thereon moves together with the X-direction moving stage 70 in the X-direction. On the other hand, when the Y-direction moving stage 71 moves together with the X-direction moving stage 70 in the X-direction, the contacting point between the transfer roller 82 and the contacting surface of the linkage projection 75e varies because the first Y-direction moving member 75, with which the transfer roller 82 that is rotatably supported on the Y-direction moving stage 71 is in contact, does not move in the X-direction. At this time, the transfer roller 82 rolls on the contacting surface of the linkage projection 75e as described above, so that the Y-direction moving stage 71 can be moved in the X-direction with no driving force in the X-direction being exerted on the first Y-direction moving member 75.

According to the above described structure of the image sensor holding unit 21, the X-direction moving stage 70, together with the Y-direction moving stage 71 that is supported by the X-direction moving stage 70 thereon, can be moved left and right in the X-direction by driving the X-direction drive motor 170x forward and reverse; and the Y-direction moving stage 71 alone can be moved upward and downward in the Y-direction by driving the Y-direction drive motor 170y forward and reverse.

The X-direction moving stage 70 is provided in the vicinity of the movement limit lug 70a with a position detection lug 70e (see FIG. 9) in the shape of a small thin plate, and the first Y-direction moving member 75 is provided in the vicinity of the movement limit lug 75b with a position detection lug 75f (see FIG. 8) in the shape of a small thin plate. As shown in FIGS. 5 and 6, the image sensor holding unit 21 is provided with a first photo-interrupter 103 and a second photo-interrupter 104. The first photo-interrupter 103 detects the presence of the position detection lug 70e of the X-direction moving stage 70 that passes between mutually facing emitter/receiver elements when the light beam is blocked by the position detection lug 70e. Likewise, the second photo-interrupter 104 detects the presence of the position detection lug 75f of the first Y-direction moving member 75 that passes between mutually facing emitter/receiver elements when the light beam is blocked by the position detection lug 75f. A specific position of the X-direction moving stage 70 in the X-direction can be detected by detecting the presence of the position detection lug 70e by the first photo-interrupter 103, while a specific position of the first Y-direction moving member 75 (the Y-direction moving stage 71) in the Y-direction can be detected by detecting the presence of the position detection lug 75f by the second photo-interrupter 104.

Figure 13:
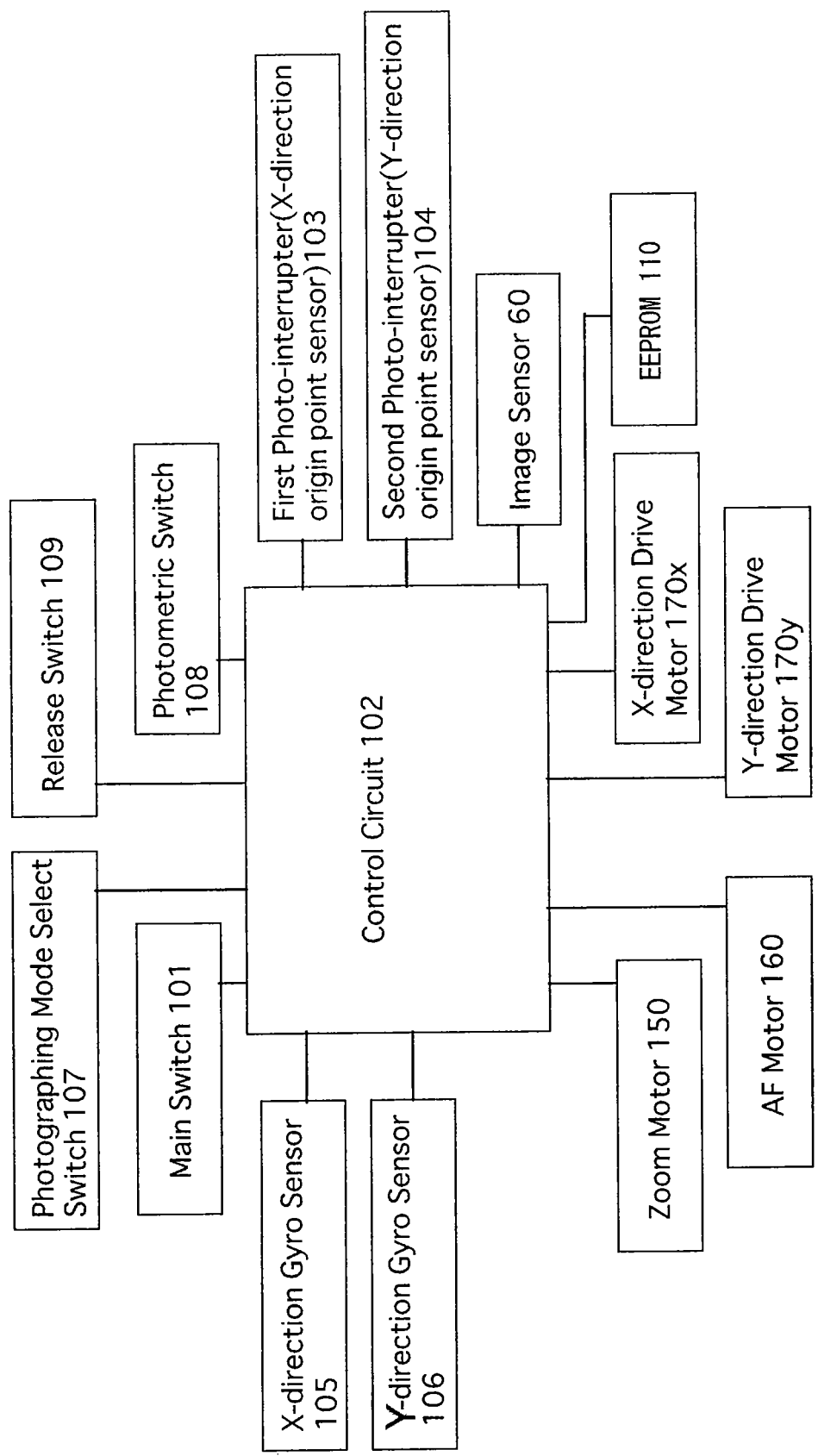
FIG. 13 is a block diagram of main components of an electrical circuit of the digital camera.

As shown in the block diagram in FIG. 13, the digital camera which is equipped with the zoom lens 5 is provided with an X-direction gyro sensor (angular velocity sensor) 105 and a Y-direction gyro sensor (angular velocity sensor) 106 which detect the angular velocity (angular speed) about two axes (the X-axis and the Y-axis) orthogonal to each other. The magnitude and the direction of camera shake (vibrations) applied to the digital camera are detected by these two gyro sensors 105 and 106. The control circuit 102 determines a moving angle by time-integrating the angular velocity of the camera shake in the two axial directions, detected by the two gyro sensors 105 and 106. Subsequently, the control circuit 102 calculates from the moving angle the moving amounts of the image on a focal plane (imaging surface of the image sensor 60) in the X-direction and in the Y-direction. The control circuit 102 further calculates the driving amounts and the driving directions of the X-direction moving stage 70 (the X-direction moving member 80) and the Y-direction moving stage 71 (the first Y-direction moving member 75 and the second Y-direction moving member 76) for the respective axial directions (driving pulses for the X-direction drive motor 170x and the Y-direction drive motor 170y) in order to counteract camera shake. Thereupon, the X-direction drive motor 170x and the Y-direction drive motor 170y are actuated and the operations thereof are controlled in accordance with the calculated values. Namely, a drive signal for camera shake correction is sent to each of the X-direction drive motor 170x and the Y-direction drive motor 170y from the control circuit 102. This counteracts image shake of an object image captured by the image sensor 60.

The digital camera can enter this image stabilization mode by turning on a photographing mode select switch 107 (see FIG. 13). If the photographing mode select switch 107 is in an OFF state, the image stabilizing capability is deactivated so that a normal photographing operation is performed. Additionally, by operating the photographing mode select switch 107, either a first tracking mode or a second tracking mode can be selected in the image stabilization mode. In the first tracking mode, image stabilization is constantly carried out by driving the X-direction drive motor 170x and the Y-direction drive motor 170y. In the second tracking mode, image stabilization activated by driving the X-direction drive motor 170x and the Y-direction drive motor 170y only when a photometric switch 108 or a release switch 109 provided in the digital camera is turned ON. For instance, the photometric switch 108 is turned ON by depressing the shutter button (not shown) of the digital camera half way, and the release switch 109 is turned ON by fully depressing the shutter button (not shown) of the digital camera.

The above described zoom lens 5 has been miniaturized by seeking the maximum efficiency of space utilization in the fully-retracted state of the zoom lens 5, and can be brought into the fully-retracted state as shown in FIG. 1 only when the image sensor 60 is held in a predetermined position. In a state where image sensor 60 is positioned deviated from this predetermined position, there is a possibility of some elements (elements movable in the optical axis direction) of the zoom lens 5 adjacent to and in front of movable elements contained on the image sensor holding unit 21 (such as the X-direction moving stage 70, the Y-direction moving stage 71, the X-direction moving member 80, the first Y-direction moving member 75 and the second Y-direction moving member 76) interfering with these movable elements contained on the image sensor holding unit 21. The aforementioned predetermined position of the image sensor 60 where the retracting operation of the zoom lens 5 can be completed will be hereinafter referred to as a retraction reference position in the following description. This retraction reference position of the image sensor 60 is determined by positioning both the X-direction moving stage 70 and the Y-direction moving stage 71 at stage reference positions in X-direction and Y-direction direction, respectively.

When the zoom lens 5 moves from the ready-to-photograph state to the fully-retracted state, the image sensor 60 is moved to the retraction reference position and held thereat by software control of the control circuit 102 under normal conditions. In other words, upon a main switch 101 (see FIG. 13) of the digital camera being turned OFF from an ON state, the control circuit 102 controls the operations of the X-direction drive motor 170$x$ and the Y-direction drive motor 170$y$ in a manner to bring the image sensor 60 to the retraction reference position. Specifically, the position of the X-direction moving stage 70 and the position of the Y-direction moving stage 71 which are detected via the first photo-interrupter 103 and the second photo-interrupter 104 can be taken as the retraction reference position (stage reference position) in the X-direction and the retraction reference position (stage reference position) in the Y-direction, respectively. Alternatively, the position of the X-direction moving stage 70 moved by an amount of movement corresponding to a predetermined number of motor drive pulses for the X-direction drive motor 170$x$ immediately after the X-direction moving stage 70 is detected via the first photo-interrupter 103 can be taken as the retraction reference position in the X-direction, while the position of the Y-direction moving stage 71 moved by an amount of movement corresponding to a predetermined number of motor drive pulses for the Y-direction drive motor 170$y$ immediately after the Y-direction moving stage 71 is detected via the second photo-interrupter 104 can be taken as the retraction reference position in the Y-direction. In this case, the number of motor drive pulses for the X-direction drive motor 170$x$ and the number of motor drive pulses for the Y-direction drive motor 170$y$ are written in an EEPROM (memory) 110 (see FIG. 13) in advance. The retraction reference positions in the X-direction and the Y-direction can be determined in any other manner. When the power to the motor-powered controller (X-direction drive motor 170$x$ and the Y-direction drive motor 170$y$) is turned OFF with the X-direction moving stage 70 and the Y-direction moving stage 71 positioned at the retraction reference position (stage reference position), the motor-powered controller solely retains the in-plane moving optical element (via the X-direction moving stage 70 and the Y-direction moving stage 71) at the reference position.

The zoom lens 5 is further provided with a mechanical guide device which can guide the image sensor 60 to the retraction reference position thereof by the retracting operation of the zoom lens 5 even in the state where the image sensor 60 is deviated from the retraction reference position thereof.

Figure 11:
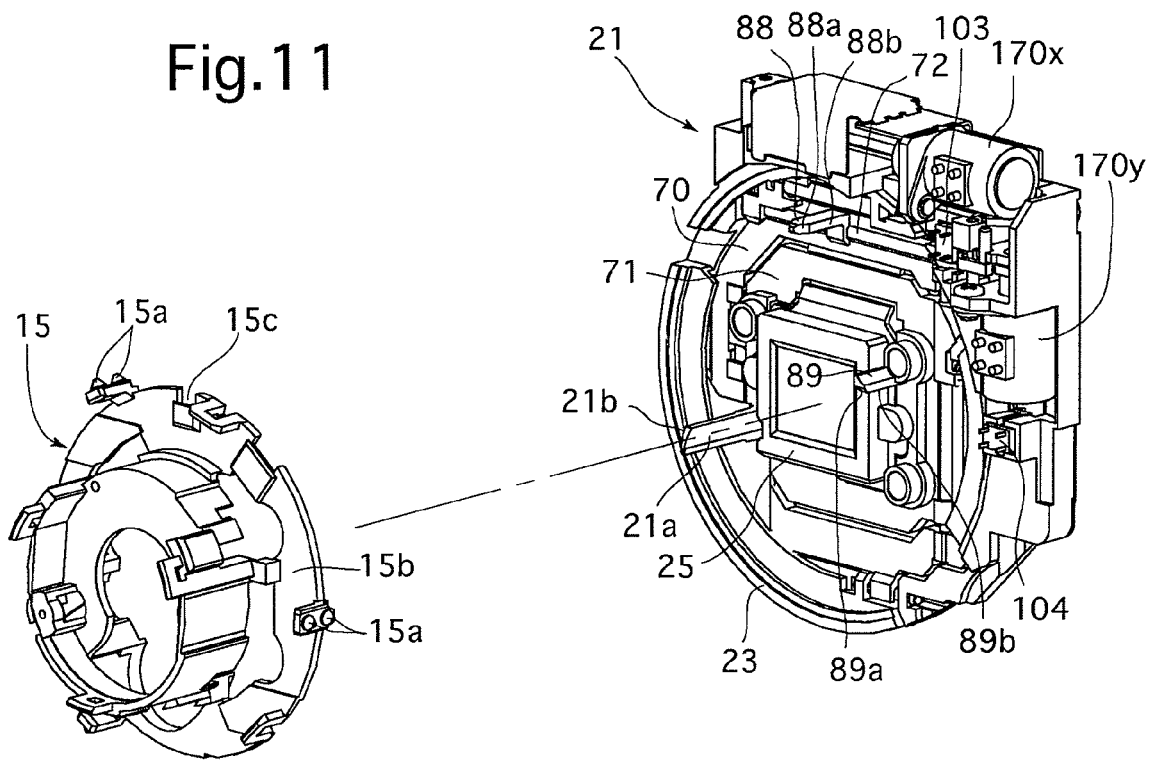
FIG. 11 is a front perspective view of the image sensor holding unit and a third lens group moving ring, showing the relative position therebetween.
Figure 12:
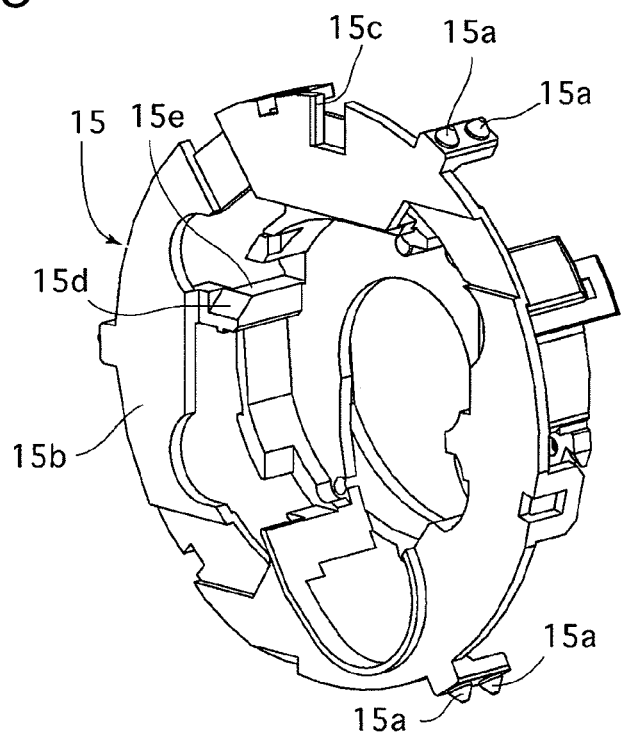
FIG. 12 is a rear perspective view of the third lens group moving ring.

As shown in FIG. 9, the X-direction moving stage 70 is provided with an X-guide projection (an element of the mechanical guide device) 88 which projects forward in the optical axis direction. The front end of the X-guide projection 88 is tapered forwardly in the optical axis direction. More specifically, the X-guide projection 88 is provided at the front end thereof with a pair of beveled surfaces (first moving guide surfaces) 88$a$, the width (the distance therebetween) of which in the X-direction decreases forwardly in the optical axis direction, and is provided immediately behind the pair of beveled surfaces 88$a$ with a pair of parallel side surfaces 88$b$ which are continuous with the pair of beveled surfaces 88$a$ and extend back to the fixed end of the X-guide projection 88 in a direction parallel to the optical axis Z1. As shown in FIGS. 11 and 12, the third lens group moving ring 15 is provided at the rear end thereof with an outer flange 15$b$ in the shape of a flat plate which lies in a plane orthogonal to the optical axis Z1, and is further provided on the outer flange 15$b$ with a slot (an element of the mechanical guide device) 15$c$ which is formed through the outer flange 15$b$ in the optical axis direction so as to constitute a cut-out formed in the outer edge of the outer flange 15$b$. The width of the slot 15$c$ is substantially the same as the distance between the pair of parallel side surfaces 88$b$; however, as shown in FIGS. 18 through 21, the rear end opening of the slot 15$c$ is tapered outwards (beveled), rearward in the optical axis direction, i.e., toward the X-guide projection 88. More specifically, the lateral side edges (right and left edges with respect to FIGS. 18 through 21) at the rear end of the slot 15$c$ are beveled to serve as a pair of beveled surfaces, the width of which in the X-direction increases toward the rear in the optical axis direction. This outwardly tapered shape of the lateral side edges at the rear end of the slot 15$c$ allows a smooth insertion operation of the X-guide projection 88 into the slot 15$c$ with no interference occurring between the X-guide projection 88 and the slot 15$c$.

As shown in FIG. 9, the Y-direction moving stage 71 is provided with a Y-guide projection (an element of the mechanical guide device) 89 which projects forward in the optical axis direction. The Y-guide projection 89 is provided at the front lower end thereof with a beveled guide surface (second moving guide surface) 89$a$ which faces obliquely downward and is formed so that the height of the Y-guide projection 89 in the Y-direction decreases forwardly in the optical axis direction, and is provided, immediately behind the beveled guide surface 89$a$ on the underside of the Y-guide projection 89, with a parallel side surface 89$b$ which is continuous with the beveled guide surface 89$a$ and extends back to the fixed end of the Y-guide projection 89 in a direction parallel to the optical axis Z1. As shown in FIG. 12, the third lens group moving ring 15 is provided with a projection-engaging beveled surface (an element of the mechanical guide device/second moving guide surface) 15$d$ and a projection-supporting flat surface (an element of the mechanical guide surface) 15$e$. The projection-engaging beveled surface 15$d$ is parallel to the beveled guide surface 89$a$ of the Y-guide projection 89, and the projection-supporting flat surface 15$e$ is continuous with the projection-engaging beveled surface 15*d* and parallel to the parallel side surface 89*b* of the Y-guide projection 89 (i.e., extending in the optical axis direction).

As described above, the third lens group moving ring 15 is a member which is guided linearly in the optical axis direction, and is retracted by an operation of the zoom motor 150 from the photographing position (forward position/operating position shown in FIGS. 2, 3 and 27) to the fully retracted position (rearward position/retracted position shown in FIGS. 1 and 32) where the third lens group moving ring 15 is positioned close to the image sensor holding unit 21 when the zoom lens 5 is fully retracted. The mechanical guide device of the present embodiment is for moving the image sensor 60 to the retraction reference position thereof by a rearward movement of the third lens group moving ring 15.

Figure 17:
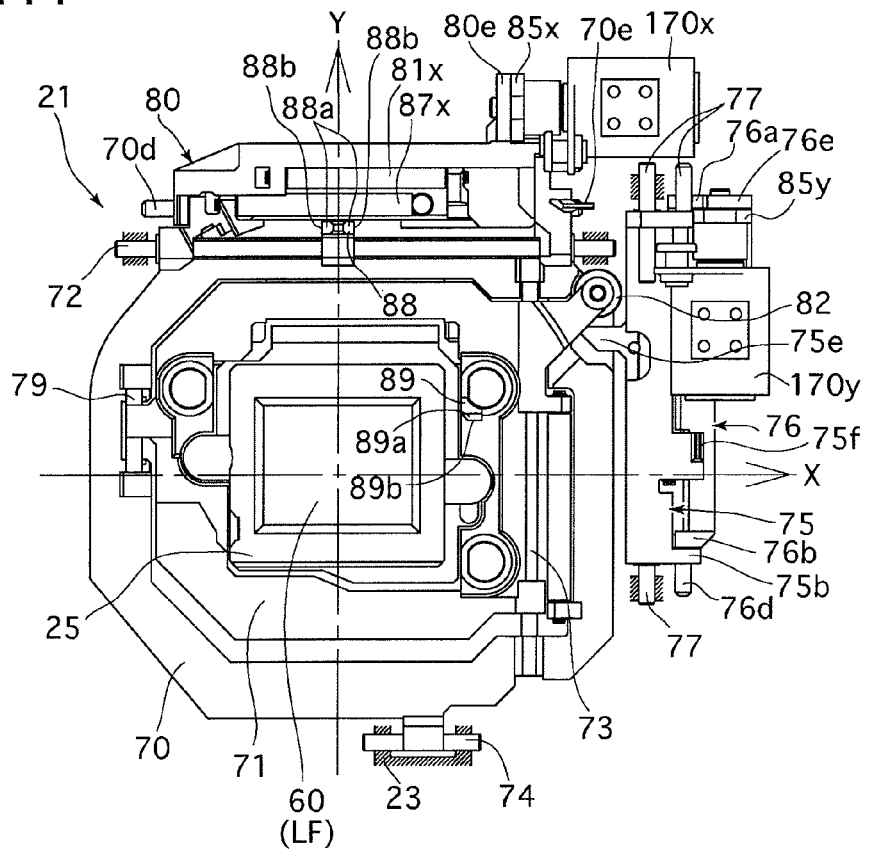
FIG. 17 is a front elevational view of the image sensor holding unit in a state where each of the X-direction moving stage and the Y-direction moving stage is in the retraction reference position thereof.
Figure 18:
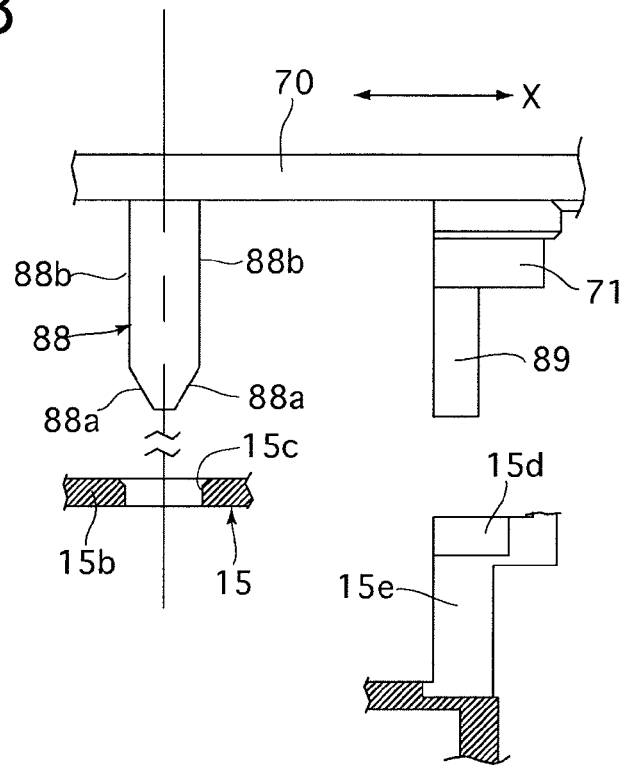
FIG. 18 is a plan view of associated portions of the X-direction moving stage, the Y-direction moving stage and the third lens group moving ring, showing the relative position between an X-direction guide projection which projects from the X-direction moving stage and a slot formed through the third lens group moving ring, and the relative position between a Y-direction guide projection which projects from the Y-direction moving stage and each of a projection-engaging beveled surface and a projection-supporting flat surface which are formed on the third lens group moving ring.
Figure 19:
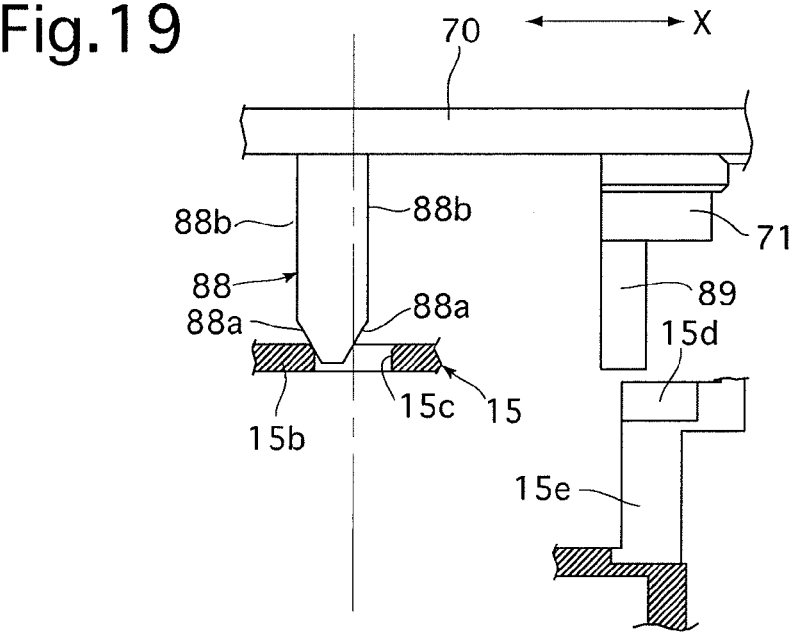
FIG. 19 is a view similar to that of FIG. 18, showing the relative position between the X-direction guide projection and the slot of the third lens group moving ring and the relative position between the Y-direction guide projection and each of the projection-engaging beveled surface and the projection-supporting flat surface of the third lens group moving ring in a state where the X-direction moving stage is deviated from the retraction reference position thereof.
Figure 20:
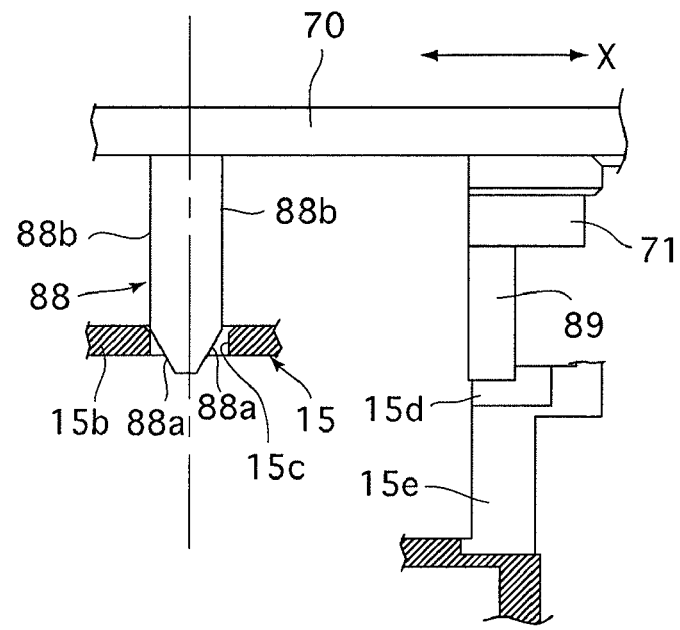
FIG. 20 is a view similar to that of FIG. 18, showing the relative position between the X-direction guide projection and the slot of the third lens group moving ring and the relative position between the Y-direction guide projection and each of the projection-engaging beveled surface and the projection-supporting flat surface of the third lens group moving ring in a state where the tip of the X-direction guide projection has entered the slot of the third lens group moving ring while a beveled guide surface formed on the Y-direction guide projection has reached a position where this beveled guide surface comes into contact with the projection-engaging beveled surface of the third lens group moving ring.
Figure 21:
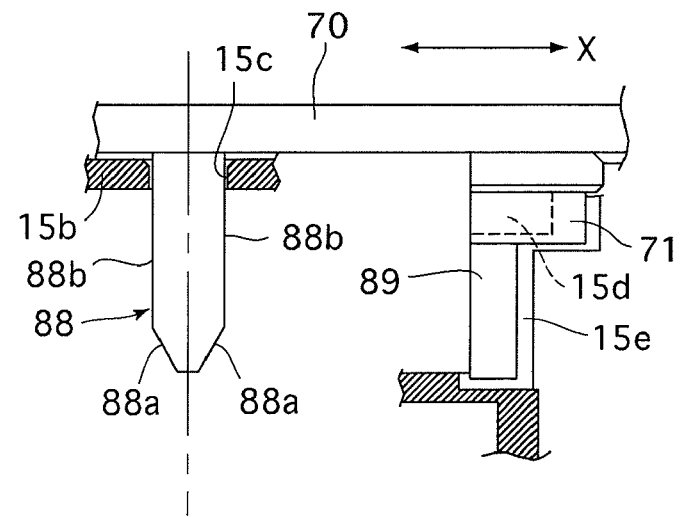
FIG. 21 is a view similar to that of FIG. 18, showing the relative position between the X-direction guide projection and the slot of the third lens group moving ring and the relative position between the Y-direction guide projection and each of the projection-engaging beveled surface and the projection-supporting flat surface of the third lens group moving ring in a state where the third lens group moving ring has retracted to the retracted position when the zoom lens barrel is fully retracted.

First, a manner of guiding the image sensor 60 (in-plane moving optical element) to the retraction reference position in the X-direction will be hereinafter discussed with reference to FIGS. 14 through 21. In addition to this retraction reference position, the image sensor 60 can be held in a neutral position at which the center of the imaging surface of the image sensor 60 is substantially coincident with the optical axis Z1. When no image stabilizing operation is performed, a photographing operation is carried out with the image sensor 60 being held at the neutral position. In the X-direction, this neutral position and the retraction reference position are coincident with each other, and FIGS. 14, 16 and 17 each show a state where the X-direction moving stage 70 is positioned at the retraction reference position (stage reference position/neutral position) in the X-direction. In this state, the centers of the X-guide projection 88 and the slot 15*c* in the widthwise direction (the X-direction) are coincident with each other as shown in FIG. 18. Therefore, if the third lens group moving ring 15 moves rearward, the X-guide projection 88 is inserted into the slot 15*c* while the pair of parallel side surfaces 88*b* move (slide) along the pair of laterally adjacent side surfaces in the slot 15*c*, respectively. At this time, no substantial position adjustment is performed by the X-guide projection 88 since the X-direction moving stage 70 is held at the retraction reference position (stage reference position) in the X-direction in advance. Thereafter, as shown in FIG. 21, upon the zoom lens 5 moving to the fully-retracted state, the outer flange 15*b* of the third lens group moving ring 15 is positioned close to the front of the X-direction moving stage 70 while the X-guide projection 88 passes through the outer flange 15*b* of the third lens group moving ring 15 through the slot 15*c*. In this state, due to the engagement of the pair of parallel side surfaces 88*b* of the X-guide projection 88 with the slot 15*c* of the third lens group moving ring 15, the X-direction moving stage 70 is held stably with no positional displacement even if an external force is exerted on the X-direction moving stage 70. Additionally, in this state, the X-direction moving stage 70 can be held in the retraction reference position (stage reference position) in the X-direction even if no power is applied to the X-direction drive motor 170*x*.

Figure 15:
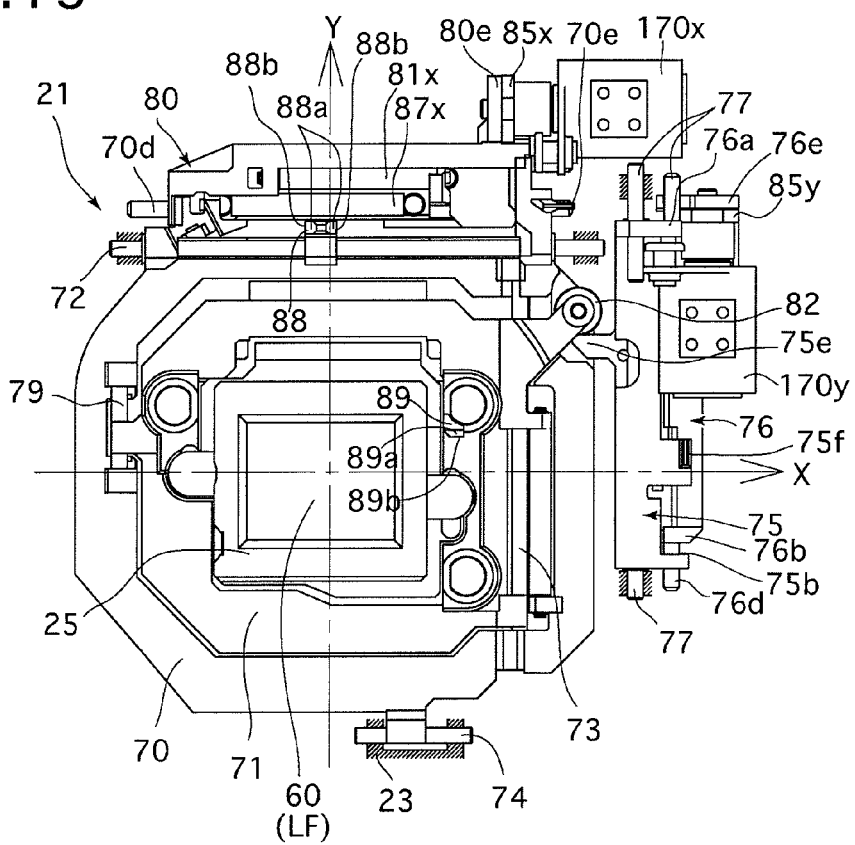
FIG. 15 is a front elevational view of the image sensor holding unit in a state where each of the X-direction moving stage and the Y-direction moving stage is deviated from both the neutral position and the retraction reference position (stage reference position) thereof.
Figure 16:
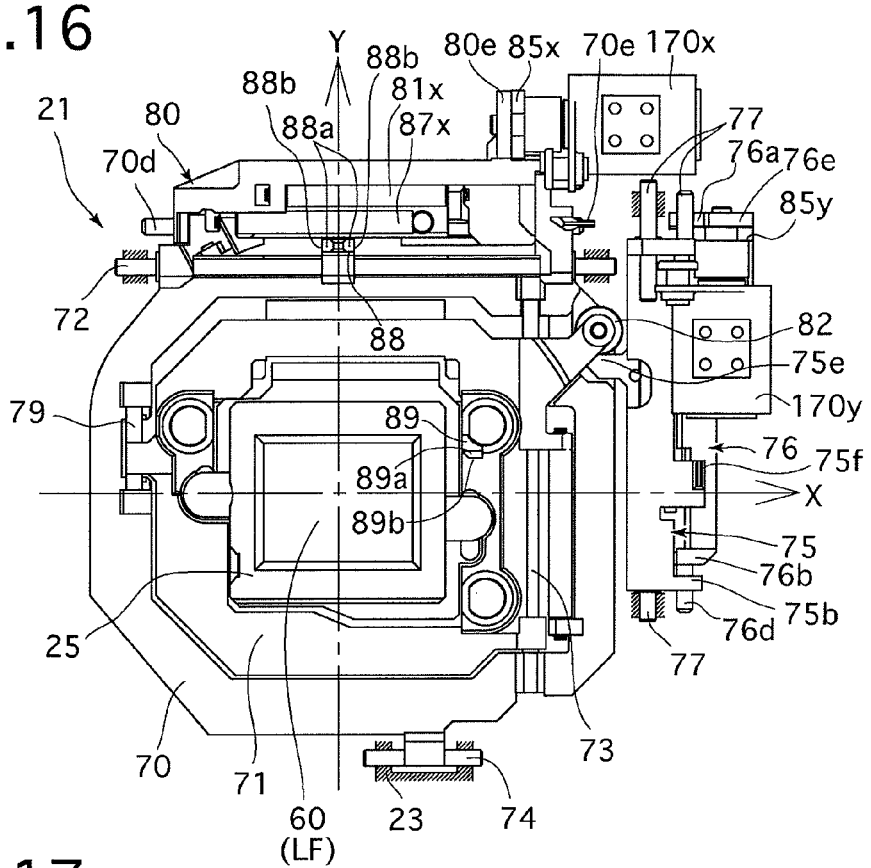
FIG. 16 is a front elevational view of the image sensor holding unit in a state where the X-direction moving stage is in the retraction reference position thereof while the Y-direction moving stage is deviated from both the neutral position and the retraction reference position thereof.

FIG. 15 shows a state where the X-direction moving stage 70 deviates from the retraction reference position (stage reference position/neutral position) in the X-direction (in the leftward direction with respect to FIG. 15). In this state, if the third lens group moving ring 15 moves rearward, one of the pair of beveled guide surfaces 88*a* of the X-guide projection 88 (the left beveled guide surface 88*a* with respect to FIG. 19) comes into contact with the edge of the slot 15*c* at the rear end thereof (that is tapered outward, toward the rear in the optical axis direction) as shown in FIG. 19. Thereupon, due to the beveled shape of the pair of beveled guide surfaces 88*a* of the X-guide projection 88, a component of force which moves the X-direction moving stage 70 in the X-direction is produced from the rearward movement of the third lens group moving ring 15, so that the third lens group moving ring 15 presses and moves the X-direction moving stage 70 rightward with respect to FIG. 15 via the X-guide projection 88. Upon the X-direction moving stage 70 reaching the retraction reference position (stage reference position) in the X-direction after being pressed and moved by the aforementioned component of force, the central axes of the X-guide projection 88 and the slot 15*c* coincide with each other as shown in FIG. 20. Thereafter, the third lens group moving ring 15 can be moved rearward to the fully-retracted position shown in FIG. 21, so that the outer flange 15*b* of the third lens group moving ring 15 is positioned close to the front of the X-direction moving stage 70 as described above.

The capability of guiding the image sensor 60 to the retraction reference position (stage reference position) of the X-direction moving stage 70 through the use of the X-guide projection 88 is effective over the entire mechanical range of movement of the X-direction moving stage 70. In other words, the pair of beveled guide surfaces 88*a* are formed to have a maximum distance therebetween which is greater than the mechanical range of movement of the X-direction moving stage 70 in the X-direction. Since the position of the X-direction moving stage 70 in the Y-direction does not change when the Y-direction moving stage 71 moves in the Y-direction, the capability of determining the retraction reference position (stage reference position) of the X-direction moving stage 70 through the use of the X-guide projection 88 is effective at all times regardless of the position of the Y-direction moving stage 71.

Figure 14:
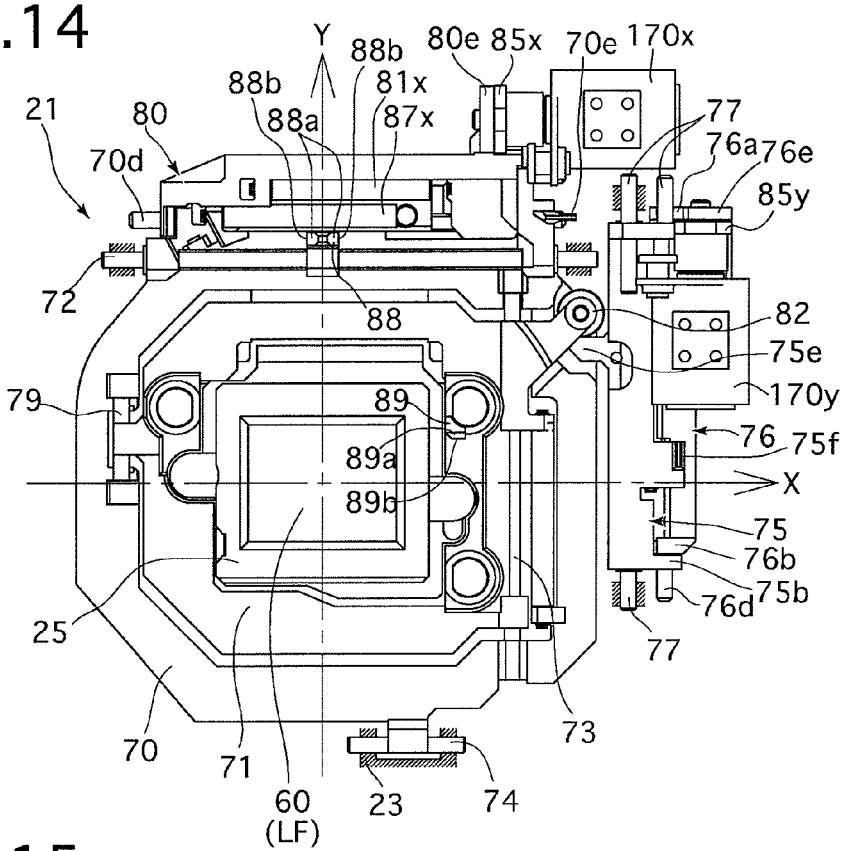
FIG. 14 is a front elevational view of the image sensor holding unit in a state where each of the X-direction moving stage and the Y-direction moving stage is in the neutral position thereof.
Figure 22:
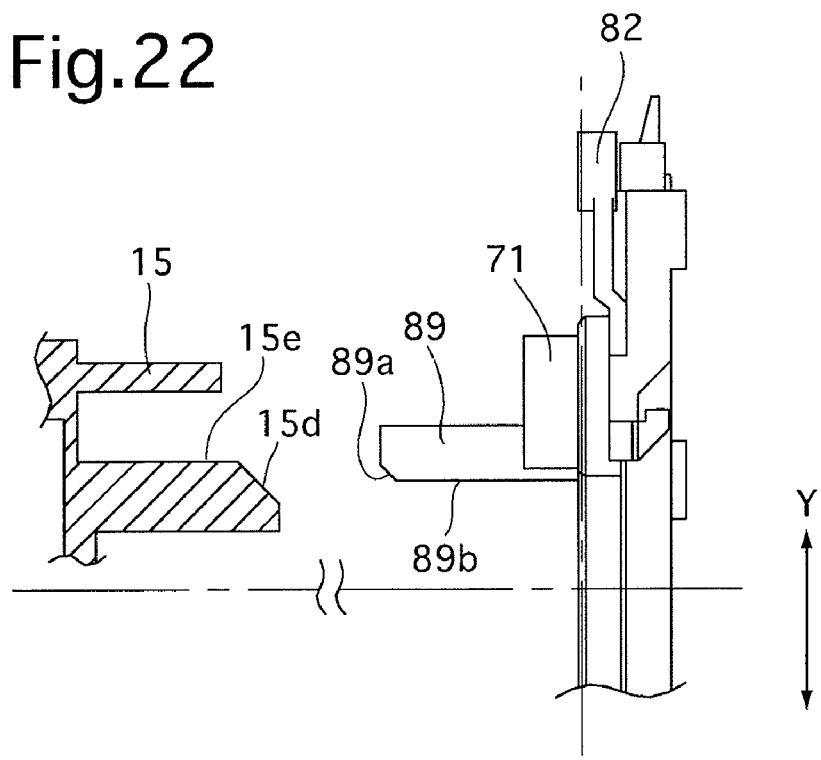
FIG. 22 is a side elevational view of the associated portions of the X-direction moving stage, the Y-direction moving stage and the third lens group moving ring that are shown in FIG. 18, showing the relative position between the Y-direction guide projection and each of the projection-engaging beveled surface and the projection-supporting flat surface of the third lens group moving ring in a state where the Y-direction moving stage is in the neutral position thereof that is below the retraction reference position thereof.
Figure 23:
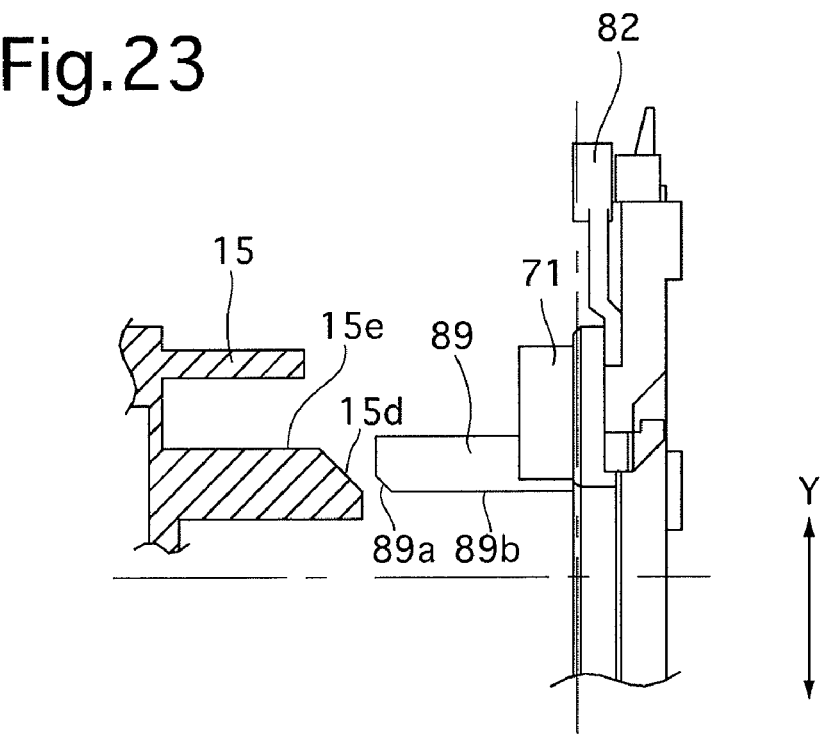
FIG. 23 is a view similar to that of FIG. 22, showing the relative position between the Y-direction guide projection and each of the projection-engaging beveled surface and the projection-supporting flat surface of the third lens group moving ring in a state where the Y-direction moving stage is in a position further below the neutral position thereof.
Figure 24:
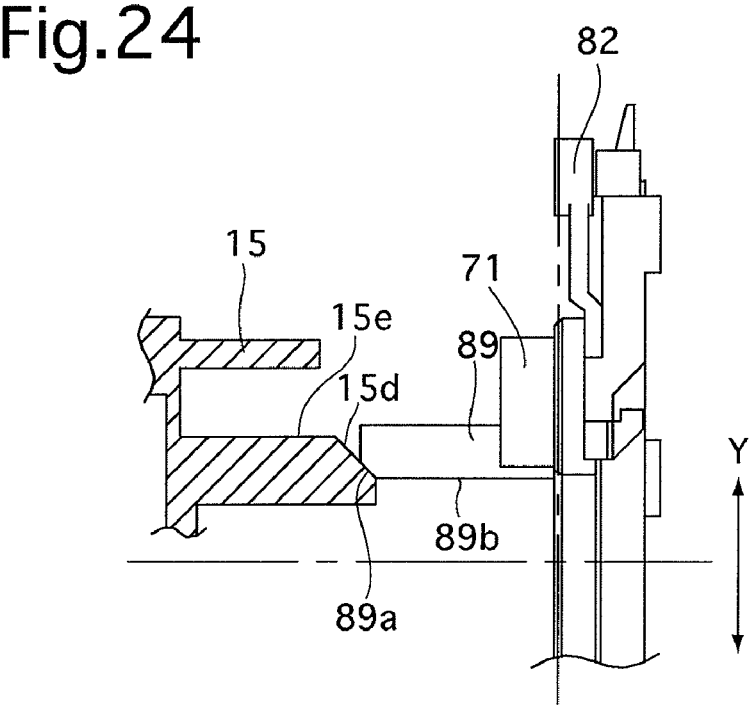
FIG. 24 is a view similar to that of FIG. 22, showing the relative position between the Y-direction guide projection and each of the projection-engaging beveled surface and the projection-supporting flat surface of the third lens group moving ring in a state where the third lens group moving ring has further retracted than that shown in FIG. 23, so that the projection-engaging beveled surface of the third lens group moving ring is in contact with the beveled guide surface of the Y-direction guide projection.
Figure 25:
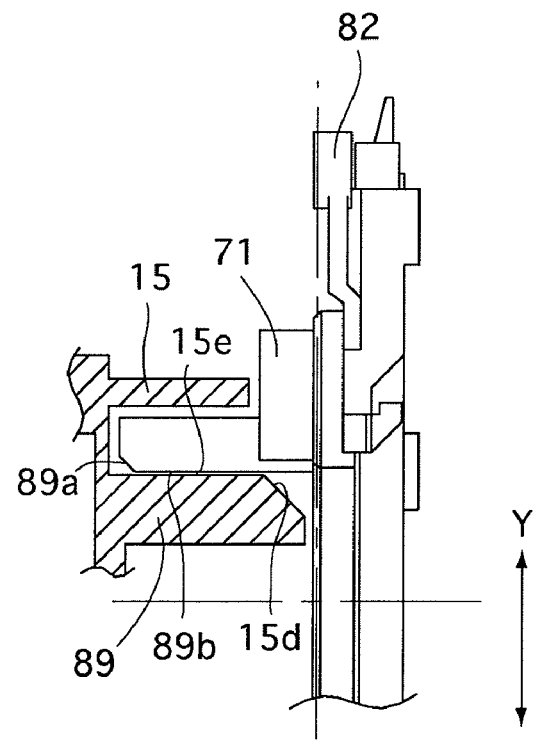
FIG. 25 is a view similar to that of FIG. 22, showing the relative position between the Y-direction guide projection and each of the projection-engaging beveled surface and the projection-supporting flat surface of the third lens group moving ring in a state where the third lens group moving ring has retracted to the retracted position when the zoom lens barrel is fully retracted.

A manner of guiding the image sensor 60 (in-plane moving optical element) to the retraction reference position in the Y-direction will be hereinafter discussed with reference to FIGS. 14 through 25. In the Y-direction, the aforementioned neutral position and the aforementioned retraction reference position of the image sensor 60 (the Y-direction moving stage 71) are not coincident with each other. The neutral position in the Y-direction is shown in FIG. 14, and the retraction reference position in the Y-direction is displaced above from the neutral position as shown in FIG. 17. For instance, in a state where the Y-direction moving stage 71 is in the neutral position in the Y-direction, the beveled guide surface 89*a* of the Y-guide projection 89 and the projection-engaging beveled surface 15*d* of the third lens group moving ring 15 face each other in the optical axis direction as shown in FIG. 22. In addition, even in the state where the Y-direction moving stage 71 is positioned below the neutral position in the Y-direction, the beveled guide surface 89*a* of the Y-guide projection 89 and the projection-engaging beveled surface 15*d* of the third lens group moving ring 15 also face each other in the optical axis direction as shown in FIG. 23. From either state shown in FIG. 22 or 23, if the third lens group moving ring 15 moves rearward, the beveled guide surface 89*a* and the projection-engaging beveled surface 15*d* come into contact with each other as shown in FIG. 24. FIG. 24 corresponds to the case shown in FIG. 23, in which the Y-direction moving stage 71 is positioned below the neutral position in the Y-direction; however, even in the case where the Y-direction moving stage 71 is in the neutral position as shown in FIG. 22, the beveled guide surface 89*a* and the projection-engaging beveled surface 15*d* come into contact with each other by a rearward movement of the third lens group moving ring 15 in a manner similar to the case shown in FIG. 24, though the relative contact range between the beveled guide surface 89*a* and the projection-engaging beveled surface 15*d* slightly changes. Thereafter, if the third lens group moving ring 15 continues to move rearward with the beveled guide surface 89*a* and the projection-engaging beveled surface 15d remaining in contact with each other, a component of force which moves the Y-direction moving stage 71 in the Y-direction is produced from the rearward movement of the third lens group moving ring 15, so that the third lens group moving ring 15 presses and moves the Y-direction moving stage 71 upward with respect to FIG. 24. Upon the Y-direction moving stage 71 reaching the retraction reference position (stage reference position) in the Y-direction after being pressed and moved by the aforementioned component of force, the parallel side surface 89b of the Y-guide projection 89 rises over the projection-engaging beveled surface 15d to be engaged with the projection-supporting flat surface 15e as shown in FIG. 25. This position where the parallel side surface 89b is engaged with the projection-supporting flat surface 15e corresponds to the retraction reference position in the Y-direction. In the state shown in FIG. 25, due to the engagement of the parallel side surface 89b with the projection-supporting flat surface 15e, the Y-direction moving stage 71 is held in the retraction reference position (stage reference position) in the Y-direction with stability, against the biasing force of the biasing spring 87y. Additionally, in this state shown in FIG. 25, the Y-direction moving stage 71 can be held in the retraction reference position (stage reference position) in the Y-direction even if no power is applied to the Y-direction drive motor 170y.

The capability of guiding the image sensor 60 to the retraction reference position (stage reference position) of the Y-direction moving stage 71 through the use of the Y-guide projection 89 is effective over the entire mechanical range of movement of the Y-direction moving stage 71. In other words, the range of formation of the beveled guide surface 89a in the Y-direction and the range of formation of the projection-engaging beveled surface 15d are wider than the mechanical range of movement of the Y-direction moving stage 71 in the Y-direction. Although the Y-direction moving stage 71 is moved with the X-direction moving stage 70 in the X-direction, the capability of determining the retraction reference position (stage reference position) of the Y-direction moving stage 71 through the use of the Y-guide projection 89 is effective at all times regardless of wherever the X-direction moving stage 70 may be positioned in the range of movement thereof in the X-direction. More specifically, when the X-direction moving stage 70 is in the retraction reference position (stage reference position/neutral position) in the X-direction, almost the entire widthwise range of the Y-guide projection 89 is positioned on an imaginary extension of the projection-engaging beveled surface 15d and the projection-supporting flat surface 15e of the third lens group moving ring 15 which extends in the optical axis direction as shown in FIGS. 18, 20 and 21 so that the Y-guide projection 89 can be brought into contact with the projection-engaging beveled surface 15d and the projection-supporting flat surface 15e. Moreover, as shown in FIG. 19, even in a state where the X-direction moving stage 70 is displaced from the retraction reference position (stage reference position) thereof in the X-direction, at least part (more than half in actuality) of the widthwise range of the Y-guide projection 89 in the X-direction is positioned on the aforementioned imaginary extension of the projection-engaging beveled surface 15d and the projection-supporting flat surface 15e. Therefore, the Y-guide projection 89 can be brought into contact with the projection-engaging beveled surface 15d and the projection-supporting flat surface 15e regardless of wherever the X-direction moving stage 70 may be positioned in the moving range thereof in the X-direction.

As described above, since the zoom lens 5 is equipped with a mechanical guide device which guides the X-direction moving stage 70 and the Y-direction moving stage 71 to the retraction reference positions (stage reference positions) thereof in the X-direction and the Y-direction if deviated from the retraction reference positions (stage reference positions) in the X-direction and the Y-direction, respectively, there is no possibility of movable elements of the zoom lens 5 which are positioned on the image sensor holding unit 21 and other elements of the zoom lens 5 in front of the former movable elements interfering with each other even if the retracting operation of the zoom lens 5 is performed without the X-direction moving stage 70 and the Y-direction moving stage 71 having been moved to the retraction reference positions (stage reference positions) thereof by software control (due to a mal-operation of the motor-powered controller). According to the above-described structure, it possible to reliably complete the retracting operation of the zoom lens 5.

Upon completion of movements of the X-direction moving stage 70 and the Y-direction moving stage 71 to the retraction reference positions (stage reference positions) thereof, the X-direction moving stage 70 and the Y-direction moving stage 71 are locked by the engagement of the X-guide projection 88 and the Y-guide projection 89 with the third lens group moving ring 15, which eliminates extra power consumption.

Figure 26:
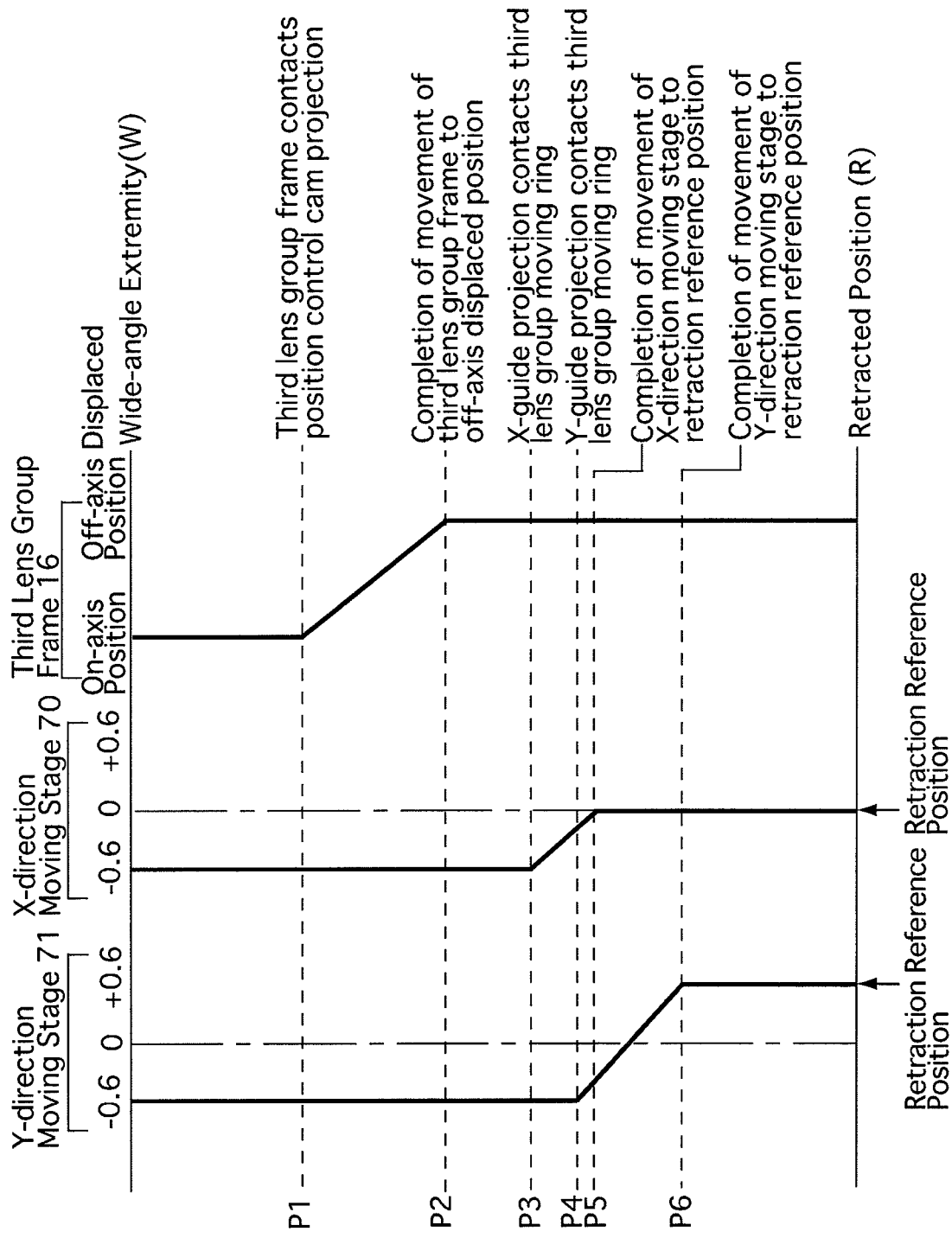
FIG. 26 is a timing chart showing the timing of the retracting operation of the third lens group frame, the retraction reference position determining operation for the X-direction moving stage and the retraction reference position determining operation for the Y-direction moving stage.

The third lens group LG3 (the third lens group frame 16), which is rotated between the on-axis position and the off-axis displaced position about the pivot shaft 17, is supported by the third lens group moving ring 15 therein that includes contacting portions which come in contact with the X-guide projection 88 and the Y-guide projection 89 as described above. FIG. 26 is a timing chart showing the temporal relationship between the retracting operation of the third lens group LG3 (the third lens group frame 16) and the retraction reference position determining operation for the X-direction moving stage 70 and the retraction reference position determining operation for the Y-direction moving stage 71 that are performed through the use of the X-guide projection 88 and the Y-guide projection 89, respectively.

The vertical axis shown in FIG. 26 represents the variation in time from the fully-retracted state (R) to the ready-to-photograph state at the wide-angle extremity (W), and the horizontal axis shown in FIG. 26 represents the position of the X-direction moving stage 70 in the X-direction, the position of the Y-direction moving stage 71 in the Y-direction, and the swing position of the third lens group frame 16 about the pivot shaft 17. In addition, "0" in the horizontal axis represents the neutral position in the X-direction moving stage 70 or the Y-direction moving stage 71. As described above, with regard to the X-direction moving stage 70, the neutral position and the retraction reference position (stage reference position) thereof are coincident with each other. On the other hand, with regard to the Y-direction moving stage 71, the position "+0.6" shown in FIG. 26 that is displaced upward from the neutral position corresponds to the retraction reference position (stage reference position) in the Y-direction. In the timing chart in FIG. 26, the numerical value "+0.6" represents the amount of variation of each of the X-direction moving stage 70 and the Y-direction moving stage 71 in millimeters from the neutral position in the plus direction, and the numerical value "−0.6" represents the amount of variation of each of the X-direction moving stage 70 and the Y-direction moving stage 71 in millimeters from the neutral position in the minus direction. In the particular example shown in FIG. 26, the amount of variation of the X-direction moving stage 70 from the neutral position thereof in the X-direction in the ready-to-photograph state at the wide-angle extremity is −0.6 mm, while the amount of variation of the Y-direction moving stage 71 from the neutral position thereof in the Y-direction in the ready-to-photograph state at the wide-angle extremity is also −0.6 mm. However, these variation amounts are merely examples; the present invention is not limited by such numerical values.

Figure 27:
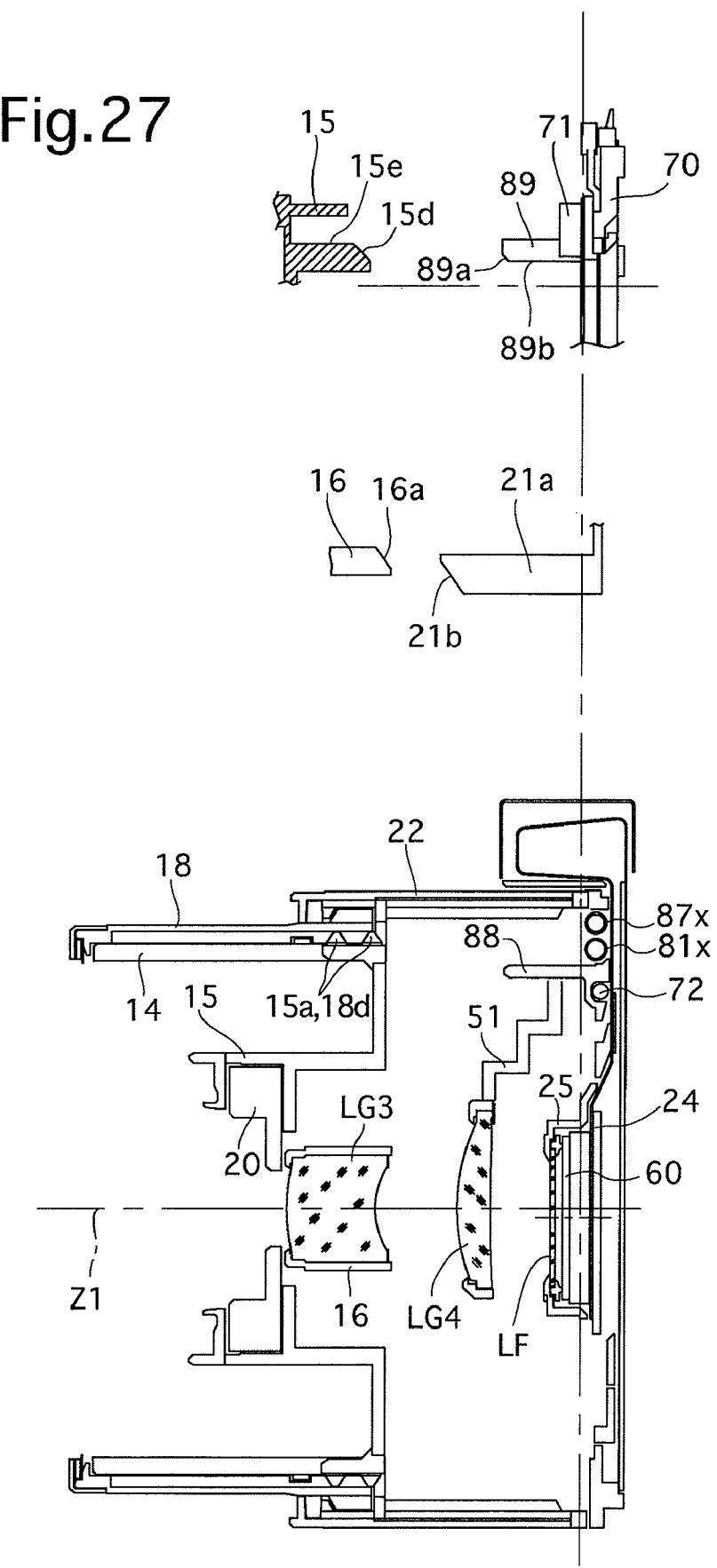
FIG. 27 is a conceptual diagram showing a longitudinal cross section of a support structure for supporting optical elements from the third lens group to the image sensor, the relative position between the third lens group moving ring and each of the X-direction guide projection and the Y-direction guide projection, and the relative position between the third lens group frame and a position-control cam bar of an associated cam mechanism in a state where the positions of these elements are aligned vertically in the same optical axis range.
Figure 28:
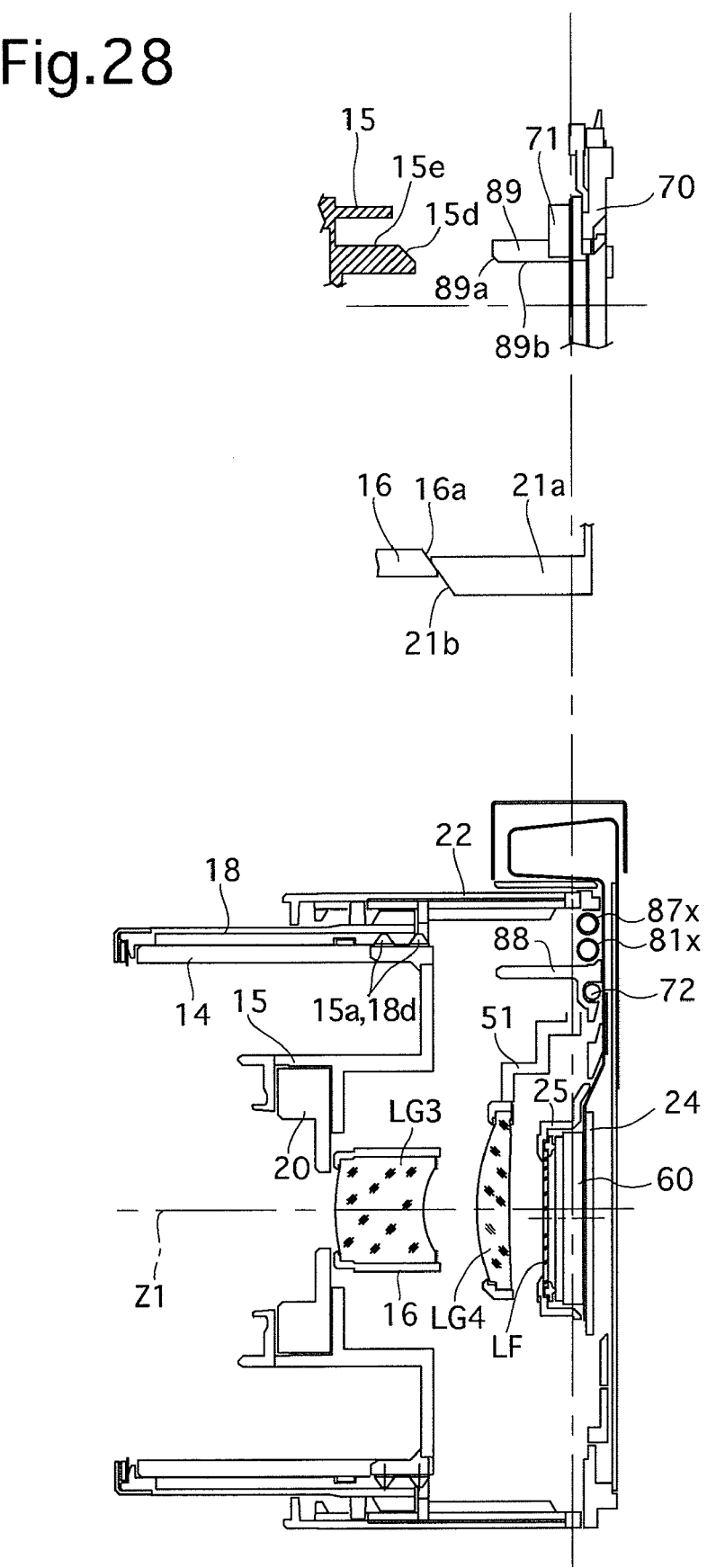
FIG. 28 is a view similar to that of FIG. 27, showing a state of the elements shown in FIG. 27 at a timing P1 of the timing chart shown in FIG. 26.
Figure 29:
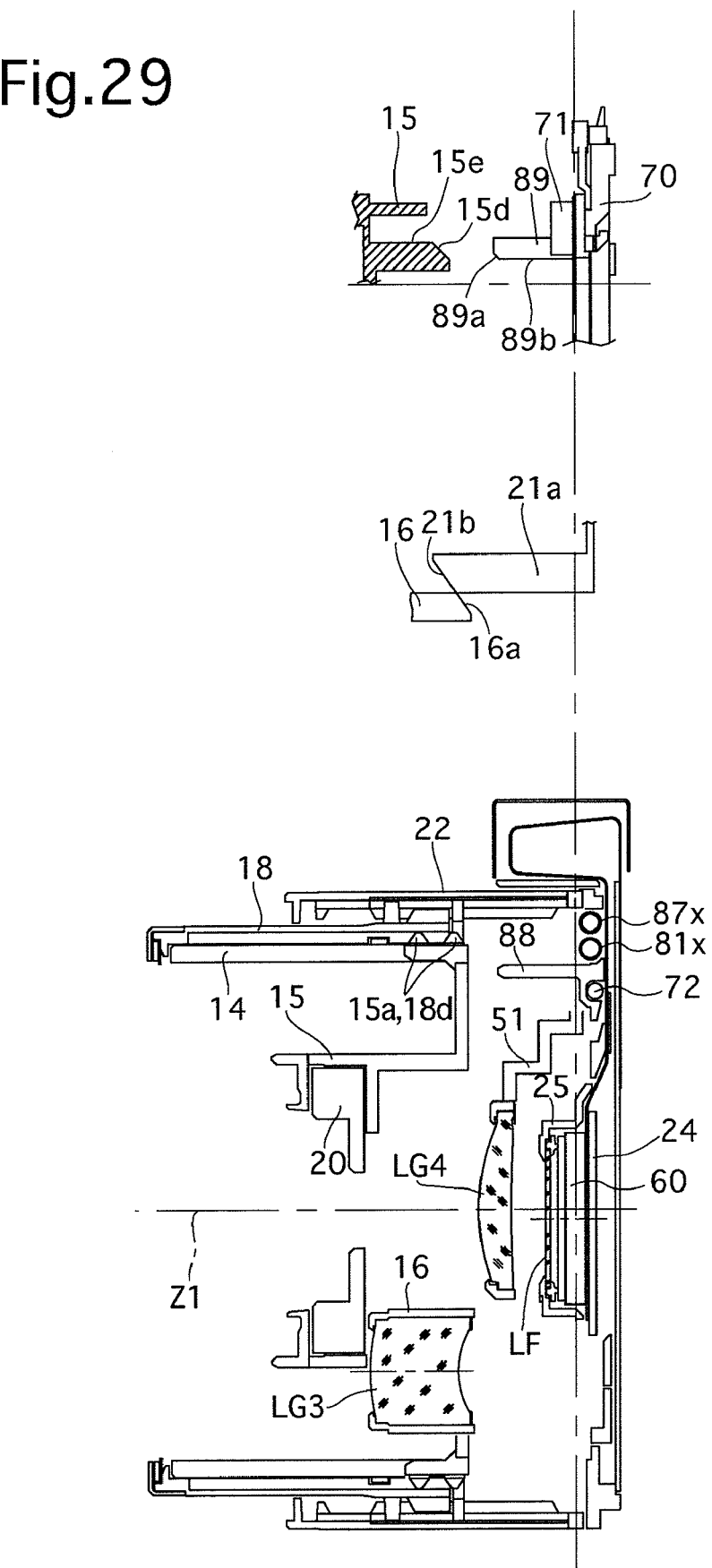
FIG. 29 is a view similar to that of FIG. 27, showing a state of the elements shown in FIG. 27 at a timing P2 of the timing chart shown in FIG. 26.

FIG. 27 shows a state corresponding to the wide-angle extremity (W) shown in FIG. 26. In this state, the third lens group frame 16 is positioned forward and away from the position-control cam bar 21a, and also the third lens group moving ring 15 is positioned forward and away from the X-guide projection 88 and the Y-guide projection 89. In this state, if the zoom lens 5 performs the retracting operation thereof from the wide-angle extremity position, firstly the cam surface 16a of the third lens group frame 16 comes into contact with the cam surface 21b of the position-control cam bar 21a at a timing P1 shown in FIG. 26 to start displacing the third lens group frame 16 to the off-axis displaced position from the on-axis position (see FIG. 28). At a timing P2 shown in FIG. 26, this displacing operation that displaces the third lens group frame 16 to the off-axis displaced position is completed (see FIG. 29).

A further rearward movement of the third lens group moving ring 15 causes the pair of beveled surfaces 88a to come into contact with the lateral side edges at the rear end of the slot 15c at a timing P3 shown in FIG. 26, and subsequently a further rearward movement of the third lens group moving ring 15 causes the X-direction moving stage 70 to be pressed and moved toward the retraction reference position (stage reference position) thereof. The surface contact at the timing P3 occurs at a timing between the state shown in FIG. 29 and the state shown in FIG. 30. Although FIG. 26 shows an example in which the retracting operation of the zoom lens 5 starts with the X-direction moving stage 70 being displaced from the retraction reference position (stage reference position/neutral position) in the X-direction by 0.6 mm, the pair of beveled surfaces 88a and the lateral side edges at the rear end of the slot 15c do not come in contact with each other when the X-direction moving stage 70 is positioned in the retraction reference position (stage reference position) in advance by software control (shown by a path of a one-dot chain line in the direction of the vertical axis in FIG. 26). Under normal conditions, the control circuit 102 drives the X-direction drive motor 170x and controls the operation thereof so that the X-direction moving stage 70 is positioned at the retraction reference position (stage reference position) in the X-direction at least during the time from the wide-angle extremity (W) to the timing P3. Only in the event that this drive control is not completed for some reason (and thus the X-direction moving stage 70 is not positioned in the retraction reference position in the X-direction) would the X-direction moving stage 70 be pressed and moved to the retraction reference position (stage reference position) in the X-direction by the X-guide projection 88.

Figure 30:
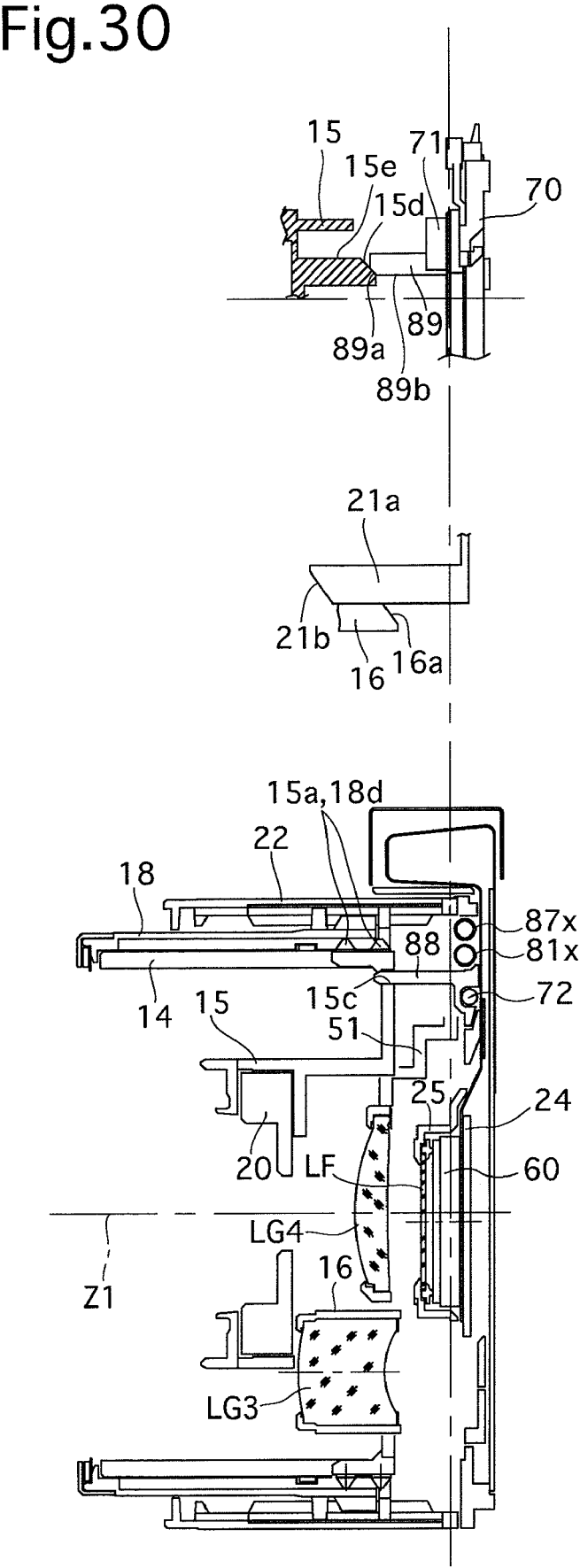
FIG. 30 is a view similar to that of FIG. 27, showing a state of the elements shown in FIG. 27 at a timing P4 of the timing chart shown in FIG. 26.

At a timing P4 shown in FIG. 26, the beveled guide surface 89a of the Y-guide projection 89 comes into contact with the projection-engaging beveled surface 15d of the third lens group moving ring 15 and presses and moves the Y-direction moving stage 71 toward the retraction reference position (stage reference position) in the Y-direction (see FIG. 30). Although FIG. 26 shows an example in which the retracting operation of the zoom lens 5 starts with the Y-direction moving stage 71 being displaced from the neutral position in a direction away from the retraction reference position (stage reference position) in the Y-direction by 0.6 mm (i.e., displaced from the retraction reference position (stage reference position) in the Y-direction by 1.2 mm), the beveled guide surface 89a and the projection-engaging beveled surface 15d do not come in contact with each other when the Y-direction moving stage 71 is positioned in the retraction reference position (stage reference position) in advance by software control (shown by a path of a one-dot chain line in the direction of the vertical axis in FIG. 26). Under normal conditions, the control circuit 102 drives the Y-direction drive motor 170y and controls the operation thereof so that the Y-direction moving stage 71 is positioned in the retraction reference position (stage reference position) in the Y-direction at least during the time from the wide-angle extremity (W) to the timing P4. Only in the event that this drive control is not completed for some reason (and thus the Y-direction moving stage 71 is not positioned in the retraction reference position in the Y-direction) would the Y-direction moving stage 71 be pressed and moved to the retraction reference position in the Y-direction by the Y-guide projection 89.

Figure 31:
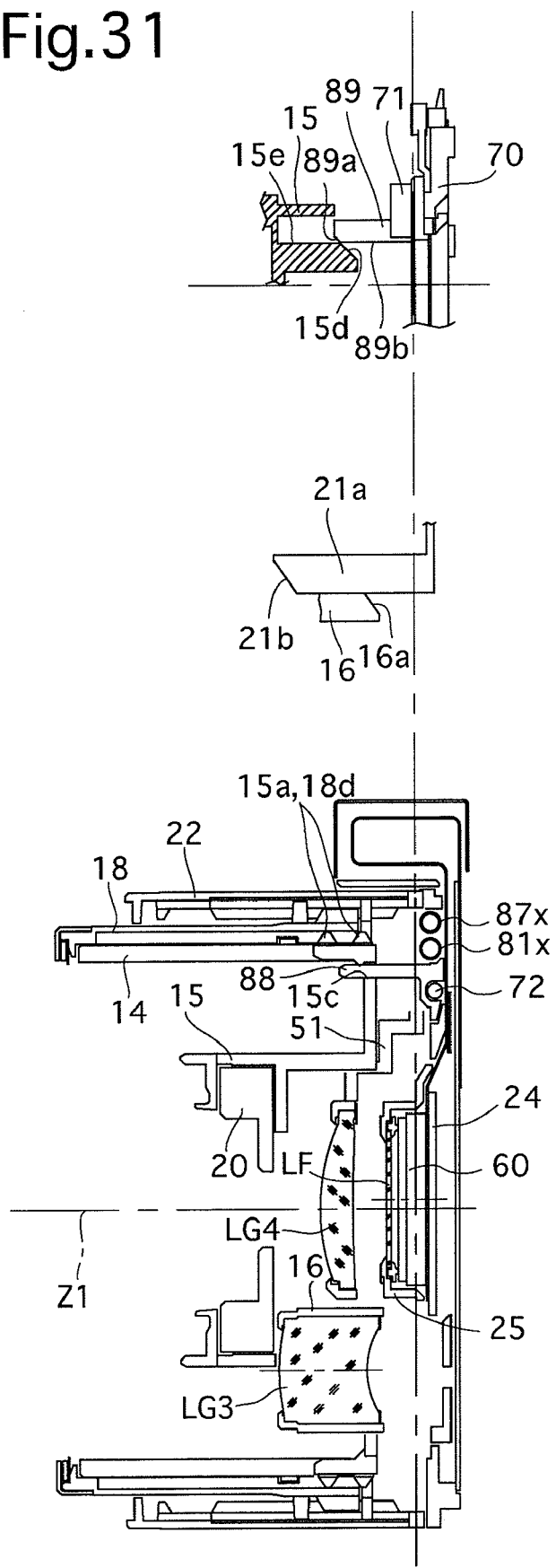
FIG. 31 is a view similar to that of FIG. 27, showing a state of the elements shown in FIG. 27 at a timing P6 of the timing chart shown in FIG. 26.
Figure 32:
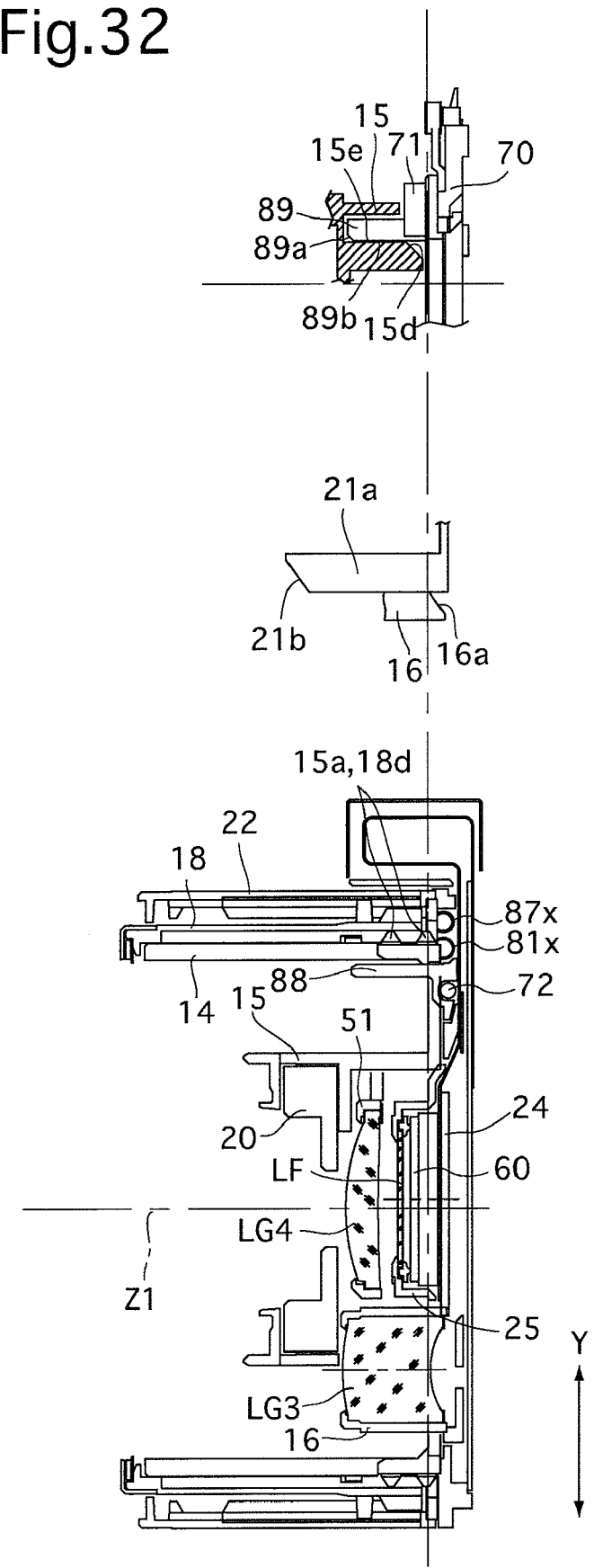
FIG. 32 is a view similar to that of FIG. 27, showing the elements shown in FIG. 27 in the fully-retracted state of the zoom lens barrel.
Figure 33:
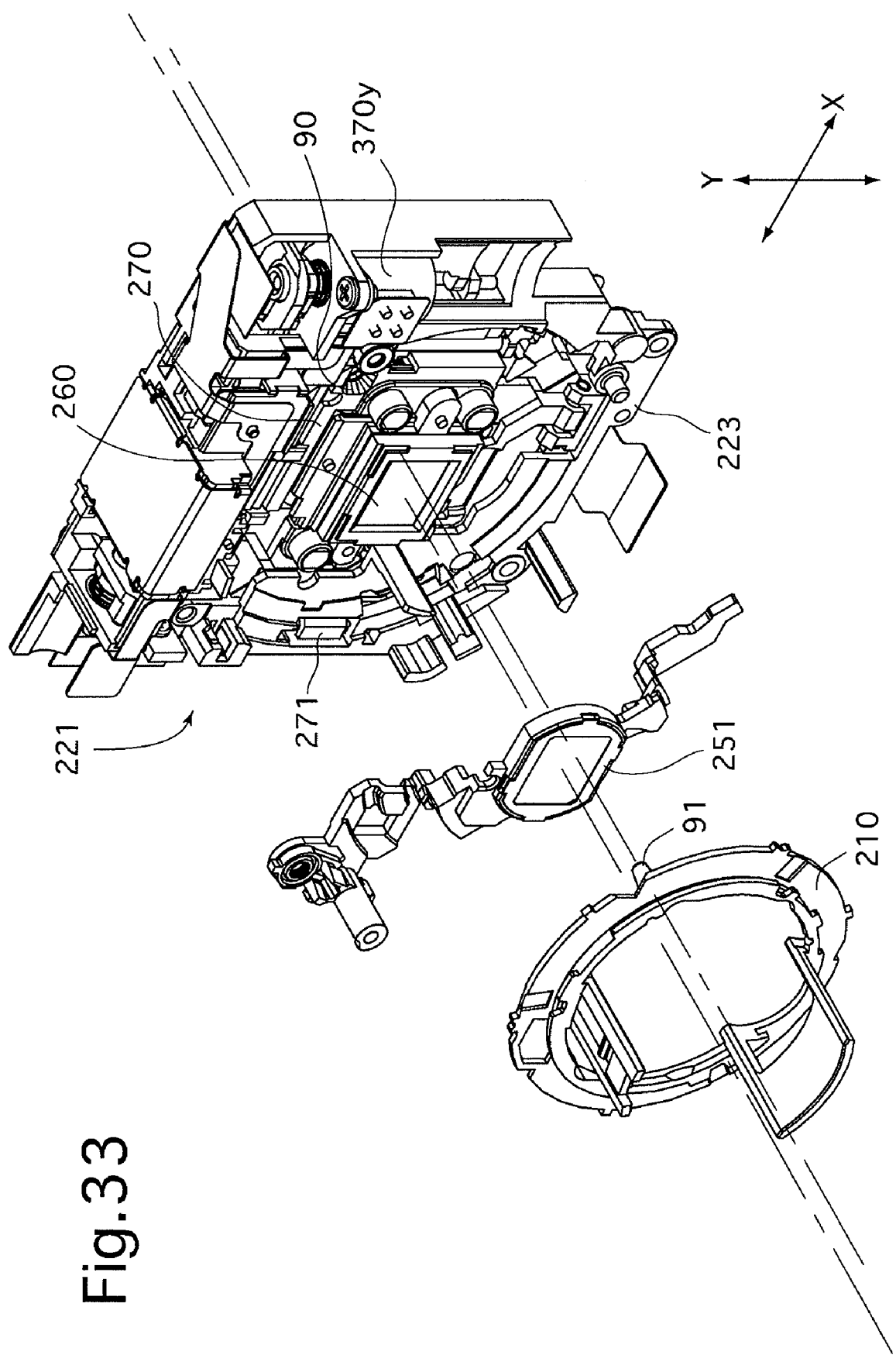
FIG. 33 is a perspective view of the image sensor holding unit, an AF lens frame and a linearly moving ring, showing a second embodiment of a mechanical guide device, provided in the zoom lens, for the in-plane moving optical element, according to the present invention.
Figure 34:
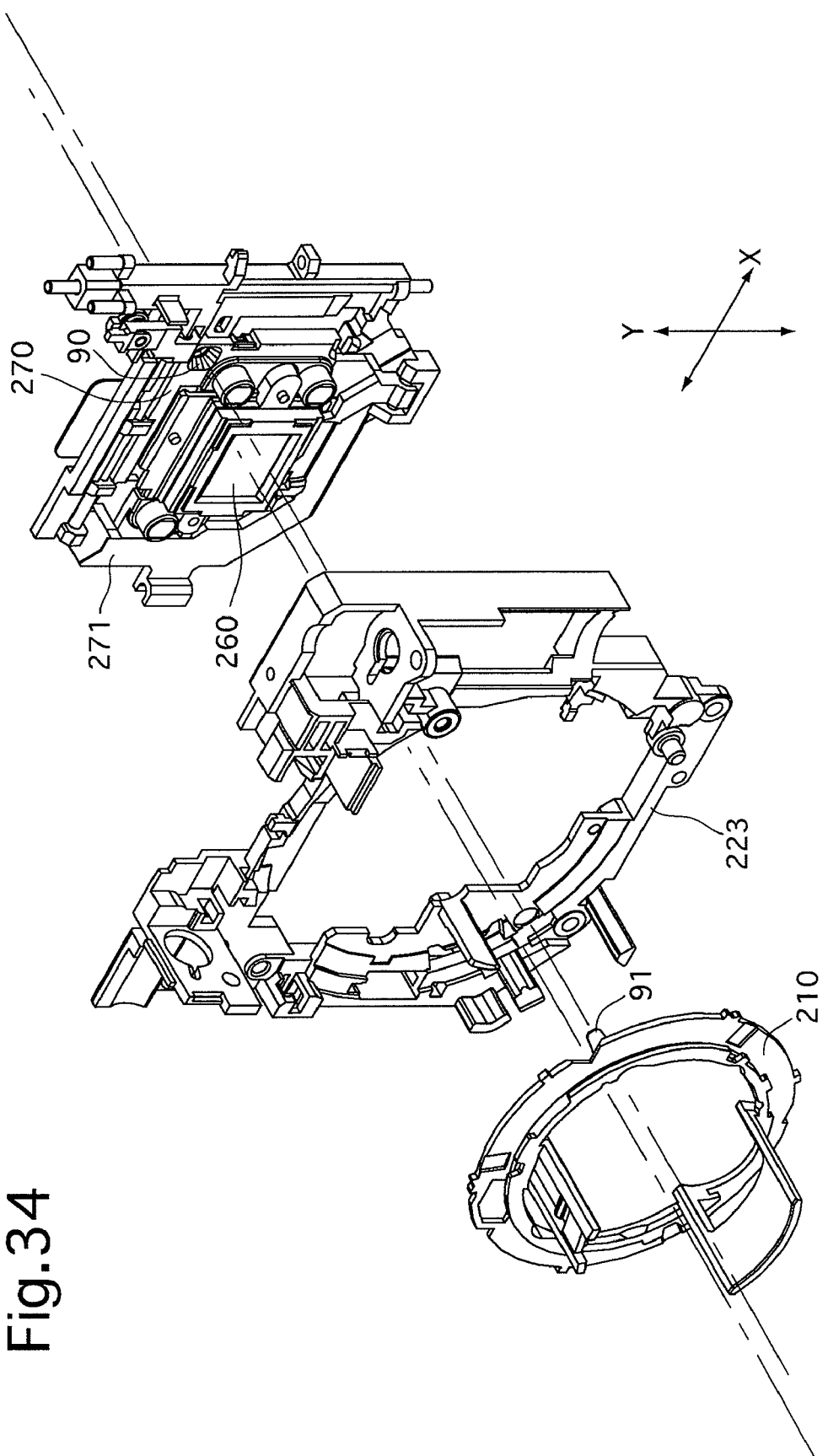
FIG. 34 is an exploded perspective view of elements shown in FIG. 33, showing a state where the image sensor holding unit is separated into two components: a stationary holder and a support member positioned inside the stationary holder.

The movement of the X-direction moving stage 70 pressed and moved by the X-guide projection 88 is completed at a timing P5 shown in FIG. 26. Subsequently, the movement of the Y-direction moving stage 71 pressed and moved by the Y-guide projection 89 is competed at a timing P6 shown in FIG. 26 (see FIG. 31). In either case whether or not a software control error occurs, both the X-direction moving stage 70 and the Y-direction moving stage 71 are held in the retraction reference positions (stage reference positions) in the X-direction and the Y-direction, respectively, at this stage. Thereafter, if the zoom lens 5 continues to retract, the third lens group moving ring 15 is fully retracted to the rearmost position (rearward position) thereof as shown in FIG. 32 to thereby cause the zoom lens 5 to come into the above described fully-retracted state that has excellent space utilization efficiency.

FIGS. 33 through 37 show second embodiment of the mechanical guide device for the in-plane moving optical element, according to the present invention. The positional relationship between an X-direction moving stage (second moving stage) 270 and a Y-direction moving stage (first moving state) 271 which serve as elements of an image sensor holding unit 221 in this embodiment is reverse to the positional relationship between the X-direction moving stage 70 and the Y-direction moving stage 71 of the previous (first) embodiment. More specifically, the Y-direction moving stage 271 is supported by a stationary holder (stationary member) 223 to be movable in the Y-direction relative to the stationary holder 223, and the X-direction moving stage 270 is supported by the Y-direction moving stage 271 in the X-direction. An image sensor (in-plane moving optical element) 260 is mounted to the X-direction moving stage 270 and supported thereby. The X-direction moving stage 270 and the Y-direction moving stage 271 are driven by an X-direction drive motor 370x and a Y-direction drive motor 370y, respectively. In addition, similar to the second linear guide ring 10 and the third lens group moving ring 15 in the first embodiment, a linearly moving ring (axial-direction moving member) 210 is guided linearly in the optical axis direction and provided as a member which moves rearward from an operating (forward) position to a retracted (rearward) position thereof so as to approach the image sensor holding unit 221 when the zoom lens moves from a ready-to-photograph state to a fully-retracted state. Additionally, an AF lens frame 251 serves as a member similar to the AF lens frame 51 of the first embodiment.

In the first embodiment, the mechanical guide device for guiding the X-direction moving stage 70 to the retraction reference position (stage reference position) in the X-direction and the mechanical guide device for guiding the Y-direction moving stage 71 to the retraction reference position (stage reference position) in the Y-direction are configured independently on the X-direction moving stage 70 and the Y-direction moving stage 71, respectively. Whereas a similar mechanical guide device is collectively arranged on the X-direction moving stage 270 as the second moving stage in the second embodiment shown in FIGS. 33 through 37. Namely, the X-direction moving stage 270 is provided with an omnidirectional guide hole (an element of the mechanical guide device) 90 having a bowl shape (inner conical shape) which includes all the oblique components in the X-direction and the Y-direction. On the other hand, the linearly moving ring 210 is provided, at a position facing the omnidirectional guide hole 90, with a guide projection (an element of the mechanical guide device) 91 which projects rearward, toward the omnidirectional guide hole 90.

Figure 35:
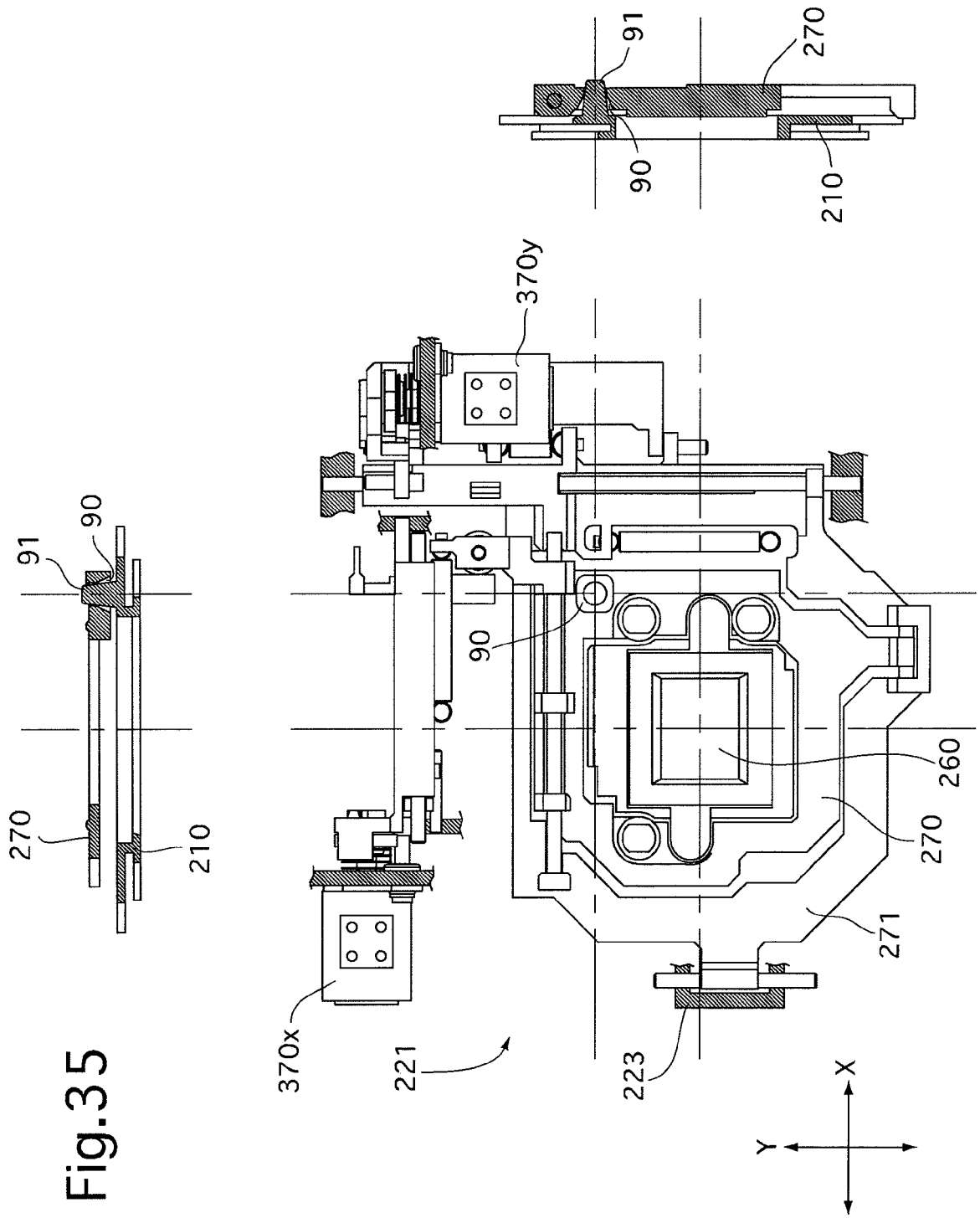
FIG. 35 is a diagram showing a state where both the X-direction moving stage and the Y-direction moving stage are positioned in the retraction reference positions thereof in the second embodiment shown in FIG. 33.

FIG. 35 shows a state where the X-direction moving stage 270 is positioned in the retraction reference position (stage reference position) in the X-direction while the Y-direction moving stage 271 is positioned in the retraction reference position (stage reference position) in the Y-direction. In this state, the omnidirectional guide hole 90 and the guide projection 91 are engaged with each other with the central axes thereof being in coincident with each other.

Figure 36:
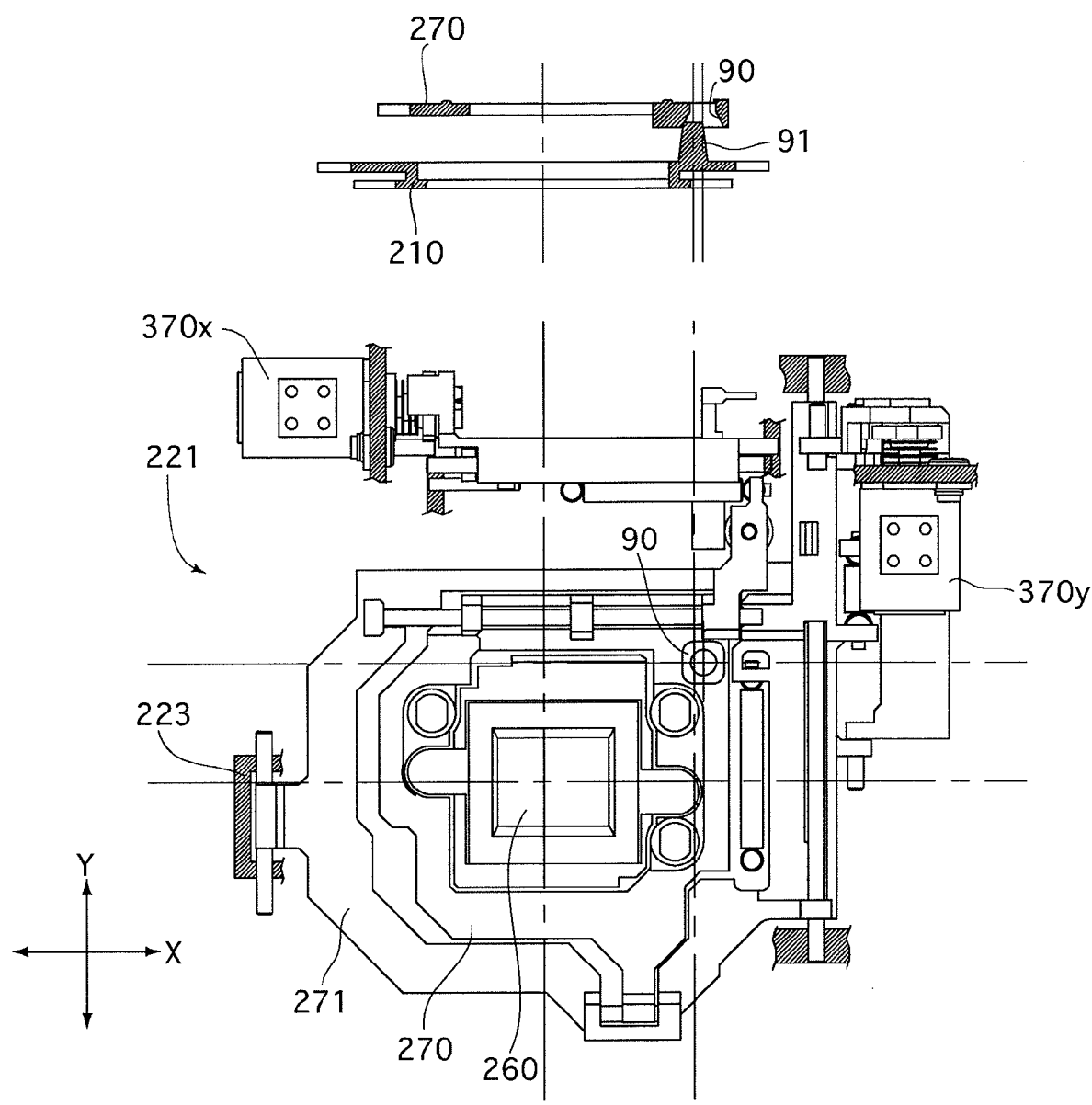
FIG. 36 is a view similar to that of FIG. 35, showing a state where the X-direction moving stage is displaced from the retraction reference position in the X-direction.

FIG. 36 shows a state where the X-direction moving stage 270 is displaced from the retraction reference position (stage reference position) in the X-direction. In this case, a rearward movement of the linearly moving ring 210 from the photographing position (forward position/operating position) toward the retracted position (rearward position) thereof causes the guide projection 91 to come into contact with an inner surface of the omnidirectional guide hole 90 in the lateral direction which includes an oblique component in the X-direction, and a further rearward movement of the linearly moving ring 210 toward the retracted position (rearward position) causes a component of force which presses and moves the X-direction moving stage 270 in the X-direction. Due to this component of force, the X-direction moving stage 270 is moved independently in the X-direction, i.e., without moving the Y-direction moving stage 271 since the X-direction moving stage 270 can move in the X-direction relative to the Y-direction moving stage 271.

Figure 37:
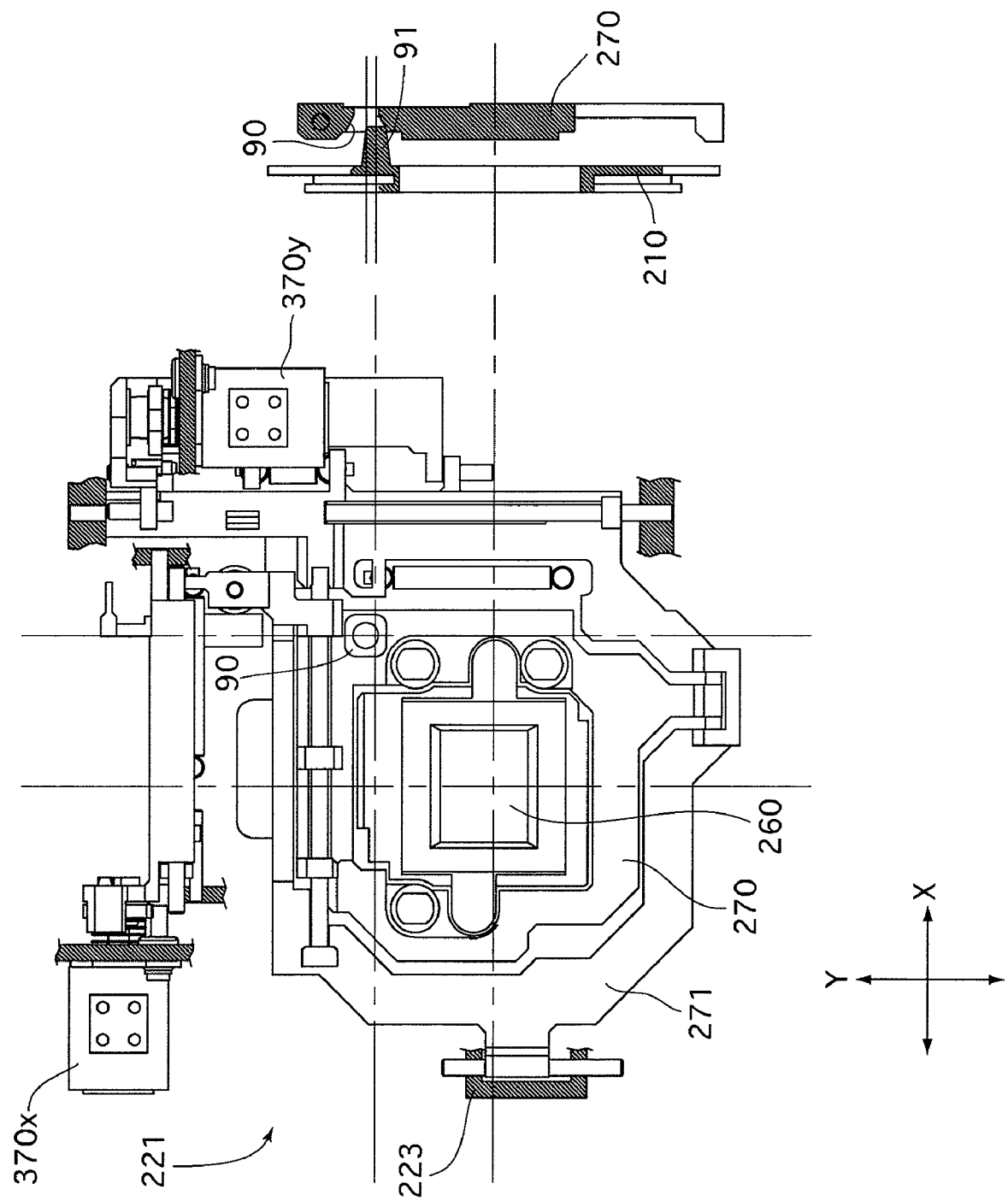
FIG. 37 is a view similar to that of FIG. 35, showing a state where the Y-direction moving stage is displaced from the retraction reference position in the Y-direction.

FIG. 37 shows a state where the Y-direction moving stage 271 is displaced from the retraction reference position (stage reference position) in the Y-direction. In this case, a rearward movement of the linearly moving ring 210 from the photographing position (forward position/operating position) toward the retracted position (rearward position) thereof causes the guide projection 91 to come into contact with an inner surface of the omnidirectional guide hole 90 in the vertical direction which includes an oblique component in the Y-direction, and a further rearward movement of the linearly moving ring 210 toward the retracted position (rearward position) causes a component of force which presses and moves the Y-direction moving stage 271 in the Y-direction. Due to this component of force, the X-direction moving stage 270 is moved integrally with the Y-direction moving stage 271 in the Y-direction, and consequently, a moving force in the Y-direction which acts on the X-direction moving stage 270 also acts on the Y-direction moving stage 271 to move the Y-direction moving stage 271 to the retraction reference position (stage reference position) in the Y-direction.

In this embodiment, the image sensor 260 can be guided to the retraction reference position only through the use of a combination of the omnidirectional guide hole 90, which is formed on the X-direction moving stage 270 therethrough, and the guide projection 91, which is formed on the linearly moving ring 210. No special guide device needs to be formed on the Y-direction moving stage 271; moreover, only one guide projection 91 is necessary as the guide device which is to be provided on the linearly moving ring 210, which makes it possible to simplify the structure of the mechanical guide device.

Although the present invention has been described based on the above illustrated embodiments, the present invention is not limited solely to these particular embodiments. For instance, although the in-plane moving optical element that is moved in a plane orthogonal to an optical axis is the image sensor 60 or 260 and movements thereof in this orthogonal plane are for correcting image shake (reduction of image shake) in the above described embodiments, the in-plane moving optical element can be any other optical element such as a lens group, and movements thereof can be for any other function other than that of correcting image shake.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging device having an operating state and a retracted state, comprising:
   an axial-direction moving member which moves from a forward position to a rearward position in an optical axis direction when said imaging device changes from said operating state to retracted state;
   an in-plane moving optical element movable in a plane orthogonal to said optical axis;
   a controller which moves said in-plane moving optical element in said orthogonal plane to a reference position when said image device changes from said operating state to said retracted state; and
   a mechanical guide device, provided between said axial-direction moving member and said in-plane moving optical element, wherein, in a state where said in-plane moving optical element is deviated from said reference position, said mechanical guide device guides said in-plane moving optical element to said reference position by using a moving force of said axial-direction moving member when said axial-direction moving member moves from said forward position to said rearward position.

2. The imaging device according to claim 1, said controller comprising a motor-powered controller which moves said in-plane moving optical element to said reference position when said image device changes from said operating state to said retracted state, wherein said motor-powered controller solely retains said in-plane moving optical element at said reference position even when a power of said motor-powered controller is turned OFF when said in-plane moving optical element has been moved to said reference position.

3. The imaging device according to claim 2, said motor-powered controller comprising:
   a guide mechanism to guide said in-plane moving optical element along the moving direction thereof,
   a stopper which determines a moving extremity of said in-plane optical element,
   a biasing member which biases said in-plane moving optical element toward said stopper so as to come into contact the stopper, and
   a motor which moves said stopper to move said in-plane moving optical element against the biasing force of said biasing member,
   wherein, in the case where said in-plane moving optical element is deviated from said reference position when said imaging device changes from said operating state to retracted state due to a mal-operation of said motor-powered controller, said mechanical guide device moves said in-plane moving optical element to said reference position against the biasing force of said biasing member so that said in-plane moving optical element and said stopper move away from each other.

4. The imaging device according to claim 1, wherein said in-plane moving optical element comprises an image pickup device, and wherein, when said imaging device is in said operating state, said controller operates to reduce image shake of an image formed on said image pickup device by moving said in-plane moving optical element in said orthogonal plane in a manner to counteract said image shake.

5. The imaging device according to claim 1 comprising:

a first moving stage mounted on a stationary member to be linearly movable in a first direction in said orthogonal plane; and a second moving stage mounted on said first moving stage to be linearly movable in a second direction in said orthogonal plane, that is orthogonal to said first direction, said in-plane moving optical element being supported on said second moving stage, wherein said reference position of said in-plane moving optical element is determined by positioning both said first moving stage and said second moving stage at stage reference positions thereof in said first direction and said second direction, respectively, wherein said mechanical guide device comprises:

a first moving guide surface which is formed on at least one of said first moving stage and said axial-direction moving member, wherein, in a state where said first moving stage is deviated from said stage reference position, said first moving guide surface engages with the other of said first moving stage and said axial-direction moving member to move said first moving stage to said stage-reference position in said first direction; and a second moving guide surface which is formed on at least one of said second moving stage and said axial-direction moving member, wherein, in a state where said second moving stage is deviated from said stage reference position, said second moving guide surface engages with the other of said second moving stage and said axial-direction moving member to move said second moving stage to said stage reference position in said second direction.

6. The imaging device according to claim 5, wherein said first moving guide surface is formed on an end of a projection, said projection projecting from said first moving stage in a direction parallel to said optical axis, and wherein said second moving guide surface is formed on an end of a projection, said projection projecting from said second moving stage in a direction parallel to said optical axis.

7. The imaging device according to claim 5, wherein each of said first moving guide surface and said second moving guide surface comprises a beveled surface which is inclined with respect to said optical axis direction.

8. The imaging device according to claim 1, comprising:

a first moving stage mounted on a stationary member to be movable linearly in a first direction in said orthogonal plane; and a second moving stage mounted on said first moving stage to be movable linearly in a second direction in said orthogonal plane, that is orthogonal to said first direction, said in-plane moving optical element being supported on said second moving stage, wherein said reference position of said in-plane moving optical element is determined by positioning both said first moving stage and said second moving stage at stage reference positions in said first direction and said second direction, respectively, wherein said mechanical guide device comprises:

a projection which projects from said axial-direction moving member; and an omnidirectional guide hole which is formed on said second moving stage, wherein in a state where said first moving stage is deviated from said stage reference position, said omnidirectional guide hole engages with said projection to move said first moving stage integrally with said second moving stage to said stage reference position in said first direction, and in a state where said second moving stage is deviated from said stage reference position, said omnidirectional guide hole engages with said projection to move said second moving stage to said stage reference position in said second direction.

9. The imaging device according to claim 8, wherein said omnidirectional guide hole is conical in shape with a central axis thereof extending substantially parallel to said optical axis.

10. The imaging device according to claim 1, wherein said axial-direction moving member supports at least one lens group.

11. The imaging device according to claim 10, wherein said lens group that is supported by said axial-direction moving member comprises a displaceable lens group movable between an on-axis position, in which said displaceable lens group is positioned on said optical axis, and an off-axis displaced position, in which said displaceable lens group is displaced from said optical axis, and wherein said imaging device further comprises a displacing drive device which moves said displaceable lens group to said off-axis displaced position by using said moving force of said axial-direction moving member before said mechanical guide device starts guiding said in-plane moving optical element to said reference position.

12. An imaging device equipped with an image stabilizer which moves an image sensor in a plane orthogonal to an optical axis to counteract image shake of an object image formed on said image sensor, said imaging device comprising:

an axial-direction moving member which moves between a forward position and a rearward position behind said forward position in an optical axis direction;

a first moving stage mounted on a stationary member to be movable linearly in a first direction in said orthogonal plane;

a second moving stage mounted on said first moving stage to be movable linearly in a second direction in said orthogonal plane, that is orthogonal to said first direction, said image sensor being supported on said second moving stage;

a first moving guide surface which is formed on at least one of said first moving stage and said axial-direction moving member, wherein, in a state where said first moving stage is deviated from a reference position in said first direction, said first moving guide surface engages with the other of said first moving stage and said axial-direction moving member to move said first moving stage to said reference position in said first direction by using a moving force of said axial-direction moving member when said axial-direction moving member moves from said forward position to said rearward position; and a second moving guide surface which is formed on at least one of said second moving stage and said axial-direction moving member, wherein, in a state wherein said second moving stage is deviated from a reference position in said second direction, said second moving guide surface engages with the other of said second moving stage and said axial-direction moving member to move said second moving stage to said reference position in said second direction by using said moving force of said axial-direction moving member when said axial-direction moving member moves from said forward position to said rearward position.

* * * * *